United States Patent
Kim et al.

(10) Patent No.: US 12,137,164 B1
(45) Date of Patent: Nov. 5, 2024

(54) STORAGE-FREE MESSAGE AUTHENTICATORS FOR ERROR-CORRECTING-CODES

(71) Applicant: Western Digital Technologies, Inc., San Jose, CA (US)

(72) Inventors: Dongwoo Kim, Seoul (KR); Cyril Guyot, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/447,868

(22) Filed: Aug. 10, 2023

Related U.S. Application Data

(60) Provisional application No. 63/510,492, filed on Jun. 27, 2023.

(51) Int. Cl.
| | |
|---|---|
| *H04L 9/32* | (2006.01) |
| *G06F 11/10* | (2006.01) |
| *H03M 13/00* | (2006.01) |
| *H03M 13/15* | (2006.01) |
| *H04L 9/08* | (2006.01) |

(52) U.S. Cl.
CPC ............ *H04L 9/32* (2013.01); *G06F 11/1032* (2013.01); *H03M 13/152* (2013.01); *H03M 13/611* (2013.01); *H04L 9/0869* (2013.01)

(58) Field of Classification Search
CPC ...... H04L 9/32; H04L 9/0869; G06F 11/1032; H03M 13/152; H03M 13/611
See application file for complete search history.

(56) References Cited

U.S. PATENT DOCUMENTS

| | | | | |
|---|---|---|---|---|
| 9,496,897 | B1* | 11/2016 | Triandopoulos | H04L 63/0435 |
| 2005/0262418 | A1* | 11/2005 | Gehrmann | H04L 9/3242 |
| | | | | 714/758 |
| 2007/0028088 | A1* | 2/2007 | Bayrak | H04L 9/0631 |
| | | | | 713/150 |
| 2012/0121084 | A1* | 5/2012 | Tomlinson | H04L 9/304 |
| | | | | 380/30 |
| 2015/0163060 | A1* | 6/2015 | Tomlinson | H04L 9/304 |
| | | | | 380/30 |
| 2017/0295012 | A1* | 10/2017 | Durand | H04L 9/0869 |

OTHER PUBLICATIONS

Lam, et al. "Message Authentication Codes with Error Correcting Capabilities". In: International Conference on Information and Communications Security. pp. 354-366. Springer (2002).

(Continued)

*Primary Examiner* — Cynthia Britt
(74) *Attorney, Agent, or Firm* — Patent Law Works LLP

(57) ABSTRACT

Techniques for storage-free message authentication for error-correcting-codes are disclosed. A storage controller of a storage device receives a request to encode a message in a format having an error-correcting code schema that generates a parity code. A key generator generates a pseudorandom transposition of the message and the parity code as a first part of a secret key. A pseudorandom character string is determined as a second part of the secret key. The output of the pseudorandom transposition and the pseudorandom character string are combined to generate the encoded message which is returned in response to the request. The secret key associated with the message is stored in non-volatile memory.

20 Claims, 10 Drawing Sheets

(56) References Cited

OTHER PUBLICATIONS

Kounavis et al., "The Magic Mode for Simultaneously Supporting Encryption, Message Authentication and Error Correction", Cryptology ePrint Archive, pp. 1-78, (2020).
Krawczyk H., "LFSR-based Hashing and Authentication", Annual International Cryptology Conference. pp. 129-139. Springer (1994).
Vajda, I., "Modified Vanstone's Construction of Lightweight Mac for Vehicular On-Board IT Systems", Journal of Computer and Communications, 8(12), pp. 214-230 (2020).

* cited by examiner

STORAGE-FREE MESSAGE
AUTHENTICATORS FOR
ERROR-CORRECTING-CODES

BACKGROUND

The present disclosure relates to message authentication. In particular, the present disclosure relates to storage-free message authenticators for error-correcting-codes.

An error correcting code (ECC) is an encoding scheme that transmits messages in such a way that the message can be recovered if some portions are erroneously flipped. Adversaries and/or bad actors may modify the message without being detected by a user. Existing approaches require additional bits for security, such as a naive application of message authentication code (MAC) which degrades storage capability. Another approach, such as a modified Bose-Chaudhuri-Hoquenghem (BCH) ECC with MAC properties by randomizing the choice of primitive element, does not provide enough security. Thus, there is a need for an encoding scheme that provides enough security while not requiring additional storage.

SUMMARY

The present disclosure relates to systems and methods for storage-free message authenticators for error-correcting-codes.

One general aspect includes a system that includes one or more processors and a memory storing instructions that, when executed, cause the one or more processors to: receive, at a storage controller of a storage device, a request to encode a message using an error-correcting code schema that generates a parity code; generate the parity code based on the error-correcting code schema; generate, at a key generating module on the storage device, a first parameter associated with the message, the first parameter may include a pseudorandom transposition of characters of the message and the parity code; determine a pseudorandom character string based on the error-correcting code schema, the pseudorandom character string having a same number of characters as the first parameter; combine the first parameter and the pseudorandom character string to generate the encoded message; return the encoded message in response to the request; and store a secret key associated with the message in the memory, where the secret key includes the first parameter and the pseudorandom character string as a second parameter.

Implementations may include one or more of the following features. The instructions may further cause the one or more processors to: receive, at the storage controller, a data retrieval request associated with a coded message stored in the memory; process the data retrieval request by decoding the encoded message using the error-correcting code schema and the secret key; responsive to the coded message being unsuccessfully decoded using the error-correcting code schema: retrieve the message as originally encoded and stored in the storage device; and decode the retrieved originally encoded message using the error-correcting code schema and the secret key; and return the decoded message responsive to the data retrieval request. The error-correcting code schema may include a Bose-Chaudhuri-Hoquenghem (bch) code; the first parameter may include a permutation of positions based on a pseudorandom function; combining the first parameter and the pseudorandom character string may include performing an exclusive-or (XOR) operation on the first parameter and the pseudorandom character string; and the request to encode the message may include a plurality of parameters, the plurality of parameters including a z parameter indicating a number of zeroes to pad the message in encoding, a k parameter indicating a number of characters in the message, a n parameter indicating a number of characters in a constructed code may include the message and the parity code, and a t parameter indicating a maximum number of error corrections. The instructions may further cause the one or more processors to: receive, at the storage controller, a data retrieval request including a coded message stored in the memory; process the data retrieval request by decoding the coded message using the secret key, where the decoding may include performing an XOR operation on the coded message and the second parameter, performing an inverse transposing operation, using the first parameter, on a result of the XOR operation on the coded message and the second parameter, and performing a BCH decoding operation on a result of the inverse transposing operation; responsive to the bch decoding operation returning an invalid word, retrieve the message as originally encoded and stored in the storage device and decode the retrieved encoded message based on the BCH code using the secret key; and return the decoded message responsive to the data retrieval request. The encoded message may be stored in the storage device by the storage controller. The error-correcting code schema may include a maximum distance separable (MDS)/Reed-Solomon (RS) code; combining the first parameter and the pseudorandom character string may include performing a modulo operation on each character of the first parameter and each character of the pseudorandom character string based on ordinal position; and the request to encode the message includes a plurality of parameters, the plurality of parameters including a q parameter indicating an alphabet size of the MDS/RS code, a k parameter indicating a number of characters in the message, a n parameter indicating a number of characters in a constructed code may include the message and the parity code, and a t parameter indicating a maximum number of error corrections. The instructions may further cause the one or more processors to: receive, at the storage controller, a data retrieval request including a coded message stored in the memory; process the data retrieval request by decoding the coded message using the secret key, where the decoding may include performing a linear combination of each character of the coded message and each character of the second parameter based on ordinal position, performing, for each ordinal position, a modulo operation of the linear combination and the q parameter, performing an inverse transposing operation on a character string may include each result of the modulo operation for each ordinal position, the inverse transposing operation on the character string based on the first parameter, and performing an MDS/RS decoding operation on a result of the inverse transposing operation; responsive to the MDS/RS decoding operation returning an invalid word, retrieve the message as originally encoded and stored in the storage device, and decode the retrieved encoded message using the secret key; and return the decoded message responsive to the data retrieval request. The encoded message may be stored in the storage device and a plurality of other storage devices by the storage controller and the instructions may further cause the one or more processors to: receive, at the storage controller, a data retrieval request associated with a coded message stored in the memory; process the data retrieval request by decoding the encoded message using the error-correcting code schema and the secret key; responsive to the coded message being unsuccessfully decoded using the error-correcting code schema, retrieve the message as originally encoded from one of the storage device and another storage device of the plurality of other storage devices and decode the retrieved originally encoded message using the error-correcting code schema and the secret key; and return the decoded message responsive to the data retrieval request. The pseudorandom character string may be derived from a stored index using a pseudorandom function. The message may include a plurality of unique messages and the instructions may further cause the one or more processors to: determine a unique pseudorandom character string based on the error-correcting code schema associated with each unique message of the plurality of unique messages, each unique pseudorandom character string having a same number of characters as the first parameter; combine the first parameter and each unique pseudorandom character string to generate a plurality of encoded messages; return the plurality of encoded message in response to the request; and store a plurality of unique secret keys associated with the plurality of encoded messages in a memory of the storage device accessible by the storage controller, where each unique secret key may include the first parameter and the each unique pseudorandom character string as a second parameter.

Another general aspect includes a computer-implemented method including: receiving, at a storage controller of a storage device, a request to encode a message using an error-correcting code schema that generates a parity code; generating the parity code based on the error-correcting code schema; generating, at a key generating module on the storage device, a first parameter associated with the message, where the first parameter may include a pseudorandom transposition of characters of the message and the parity code; determining a pseudorandom character string based on the error-correcting code schema, the pseudorandom character string having a same number of characters as the first parameter; combining the first parameter and the pseudorandom character string to generate the encoded message; returning the encoded message in response to the request; and storing a secret key associated with the message in a memory of the storage device accessible by the storage controller, where the secret key may include the first parameter and the pseudorandom character string as a second parameter.

Implementations may include one or more of the following features. The computer implemented method may include: receiving, at the storage controller, a data retrieval request associated with a coded message stored in the memory; processing the data retrieval request by decoding the coded message using the error-correcting code schema and the secret key; responsive to the coded message being unsuccessfully decoded using the error-correcting code schema, retrieving the message as originally encoded and stored in the storage device and decoding the retrieved originally encoded message using the error-correcting code schema and the secret key; and returning the decoded message responsive to the data retrieval request. The error-correcting code schema may include a Bose-Chaudhuri-Hoquenghem (BCH) code; the first parameter may include a permutation of positions based on a pseudorandom function; combining the first parameter and the pseudorandom character string may include performing an exclusive-or (XOR) operation on the first parameter and the pseudorandom character string; and the request to encode the message includes a plurality of parameters, the plurality of parameters including a z parameter indicating a number of zeroes to pad the message in encoding, a k parameter indicating a number of characters in the message, a n parameter indicating a number of characters in a constructed code may include the message and the parity code, and a t parameter indicating a maximum number of error corrections. The computer-implemented method may include: receiving, at the storage controller, a data retrieval request associated with a coded message stored in the memory; processing the data retrieval request by decoding the coded message using the secret key, where the decoding may include performing an XOR operation on the coded message and the second parameter; performing an inverse transposing operation, using the first parameter, on a result of the XOR operation on the coded message and the second parameter; and performing a BCH decoding operation on a result of the inverse transposing operation; responsive to the bch decoding operation returning an invalid word, retrieving the message as originally encoded and stored in the storage device and decoding the retrieved encoded message based on the BCH code using the secret key; and returning the decoded message responsive to the data retrieval request. The encoded message may be stored in the storage device by the storage controller. The error-correcting code schema may include a Maximum Distance Separable (MDS)/Reed-Solomon (RS) code; combining the first parameter and the pseudorandom character string may include performing a modulo operation on each character of the first parameter and each character of the pseudorandom character string based on ordinal position; and the request to encode the message includes a plurality of parameters, the plurality of parameters including a q parameter indicating an alphabet size of the MDS/RS code, a k parameter indicating a number of characters in the message, a n parameter indicating a number of characters in a constructed code may include the message and the parity code, and a t parameter indicating a maximum number of error corrections. The computer-implemented method may include: receiving, at the storage controller, a data retrieval request associated with a coded message stored in the memory; processing the data retrieval request by decoding the coded message using the secret key, where the decoding may include: performing a linear combination of each character of the coded message and each character of the second parameter based on ordinal position, performing, for each ordinal position, a modulo operation of the linear combination and the q parameter, performing an inverse transposing operation on a character string may include each result of the modulo operation for each ordinal position, the inverse transposing operation on the character string based on the first parameter, and performing an MDS/RS decoding operation on a result of the inverse transposing operation; responsive to the MDS/RS decoding operation returning an invalid word, retrieving the message as originally encoded and stored in the storage device and decoding the retrieved originally encoded message using the secret key; and returning the decoded message responsive to the data retrieval request. The encoded message may be stored in the storage device and a plurality of other storage devices by the storage controller and the method may further include: receiving, at the storage controller, a data retrieval request associated with a coded message stored in the memory; processing the data retrieval request by decoding the encoded message using the error-correcting code schema and the secret key; responsive to the coded message being unsuccessfully decoded using the error-correcting code schema, retrieving the message as originally encoded from one of the storage device and another storage device of the plurality of other storage devices and decoding the retrieved originally encoded message using the error-correcting code schema and the secret key; and returning the decoded message responsive to the data retrieval request. The message may include a plurality of unique messages and the method may further include: determining a unique pseudorandom character string based on the error-correcting code schema associated with each unique message of the plurality of unique messages, each unique pseudorandom character string having a same number of characters as the first parameter; combining the first parameter and each unique pseudorandom character string to generate a plurality of encoded messages; returning the plurality of encoded message in response to the request; and storing a plurality of unique secret keys associated with the plurality of encoded messages in a memory of the storage device accessible by the storage controller, where each unique secret key may include the first parameter and the each unique pseudorandom character string as a second parameter.

Still another general aspect includes a system that includes: means for receiving, at a storage controller of a storage device, a request to encode a message using an error-correcting code schema that generates a parity code; means for generating the parity code based on the error-correcting code schema; means for generating, at a key generating module on the storage device, a first parameter associated with the message, where the first parameter may include a pseudorandom transposition of characters of the message and the parity code; means for determining a pseudorandom character string based on the error-correcting code schema, the pseudorandom character string having a same number of characters as the first parameter; means for combining the first parameter and the pseudorandom character string to generate the encoded message; means for returning the encoded message in response to the request; and means for storing a secret key associated with the message in a memory of the storage device accessible by the storage controller, where the secret key may include the first parameter and the pseudorandom character string as a second parameter.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve message passing security and format efficiency using an encoding scheme that enables message authentication without the storage of additional data. Accordingly, the embodiments disclosed herein provide various improvements to storage networks and/or storage systems.

Other implementations of one or more of these aspects include corresponding systems, apparatus, and computer programs, configured to perform the actions of the methods, encoded on computer storage devices. It should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Systems and methods for storage-free message authenticators for error-correcting codes are described below. While the systems and methods of the present disclosure are described in the context of a particular system architecture, it should be understood that the systems and methods can be applied to other architectures and organizations of hardware.

Figure 1:
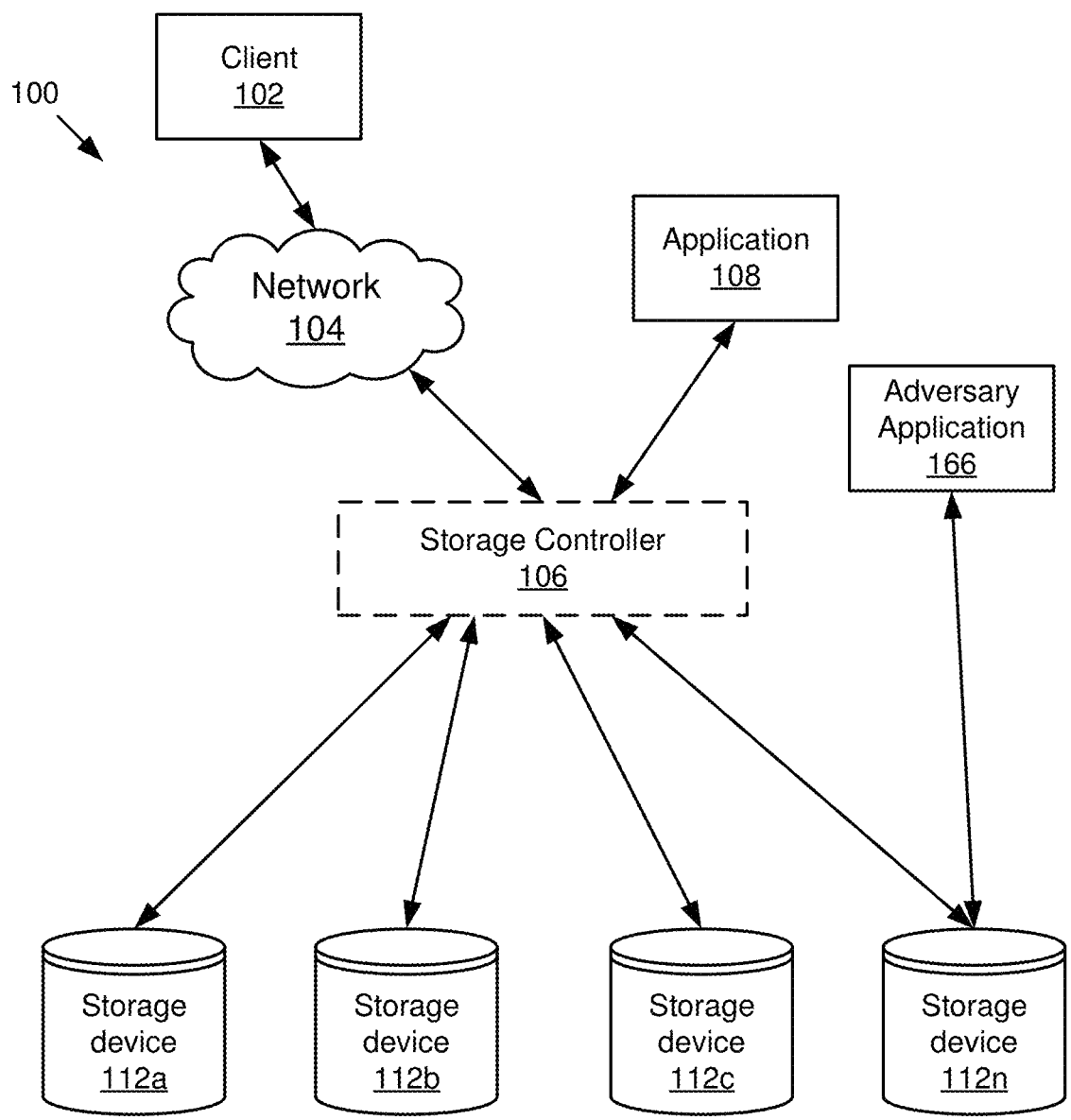
FIG. 1 is a high-level block diagram illustrating an example system including a storage system having multiple storage devices and a storage controller.

FIG. 1 is a high-level block diagram illustrating an example system 100 including a storage system having multiple data storage devices 112 and a storage controller 106. The system 100 includes client 102, a network 104, an application 108, an adversary application 166 and a storage system including storage devices 112a . . . 112n. In some embodiments, the system 100 may optionally include a storage controller 106.

The client device 102 can be any computing device including one or more memory and one or more processors, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of making storage requests. A client device 102 may execute an application that makes storage requests (e.g., read, write, etc.) to the storage devices 112. While the example of FIG. 1 includes one client 102, it should be understood that any number of clients 102 may be present in the system. Clients may be directly coupled with storage sub-systems including individual storage devices (e.g., storage device 112a) or storage systems behind a separate controller.

In some embodiments, the system 100 includes a storage controller 106 that provides a single interface for the client device 102 to access the storage devices 112 in the storage system. In various embodiments, the storage devices may be directly connected with the storage controller 106 (e.g., storage device 112a) or may be connected through a separate controller. The storage controller 106 may be a computing device configured to make some or all of the storage space on storage devices 112 available to clients 102. As depicted in the example system 100, client devices can be coupled to the storage controller 106 via network 104 (e.g., client 102).

The network 104 can be a conventional type, wired or wireless, and may have numerous different configurations including a star configuration, token ring configuration, or other configurations. Furthermore, the network 104 may include a local area network (LAN), a wide area network (WAN) (e.g., the internet), and/or other interconnected data paths across which multiple devices (e.g., storage controller 106, client device 102, etc.) may communicate. In some embodiments, the network 104 may be a peer-to-peer network. The network 104 may also be coupled with or include portions of a telecommunications network for sending data using a variety of different communication protocols. In some embodiments, the network 104 may include Bluetooth (or Bluetooth low energy) communication networks or a cellular communications network for sending and receiving data including via short messaging service (SMS), multimedia messaging service (MMS), hypertext transfer protocol (HTTP), direct data connection, wireless application protocol (WAP), email, etc. Although the example of FIG. 1 illustrates one network 104, in practice one or more networks 104 can connect the entities of the system 100.

FIG. 1 illustrates an application 108 that is communicatively coupled to storage controller 106. In some embodiments, the application 108 may operate on a system connected to the storage controller 106 directly. For example, the application 108 may operate on a computing device (e.g., a server, a wireless cellular device, a content streaming device, distributed storage system, an automotive control system) that hosts the storage controller 106. The application 108 may include an encoding scheme for error-correction-codes for a message before storing the message in the storage devices 112 to account for random errors that may occur (e.g., bit flipping). An adversary application 166 may be communicatively coupled to a storage device 112n, in an embodiment. In this way, the adversary application 166 may attempt to modify a message at a bit level stored directly in memory at the storage device 112n. The adversary application 166 may be another application operating on the same computing device that has a sufficiently high privilege to access memory pages within the computing device and/or storage devices 112 and modify particular messages at the bit level.

Figure 2:
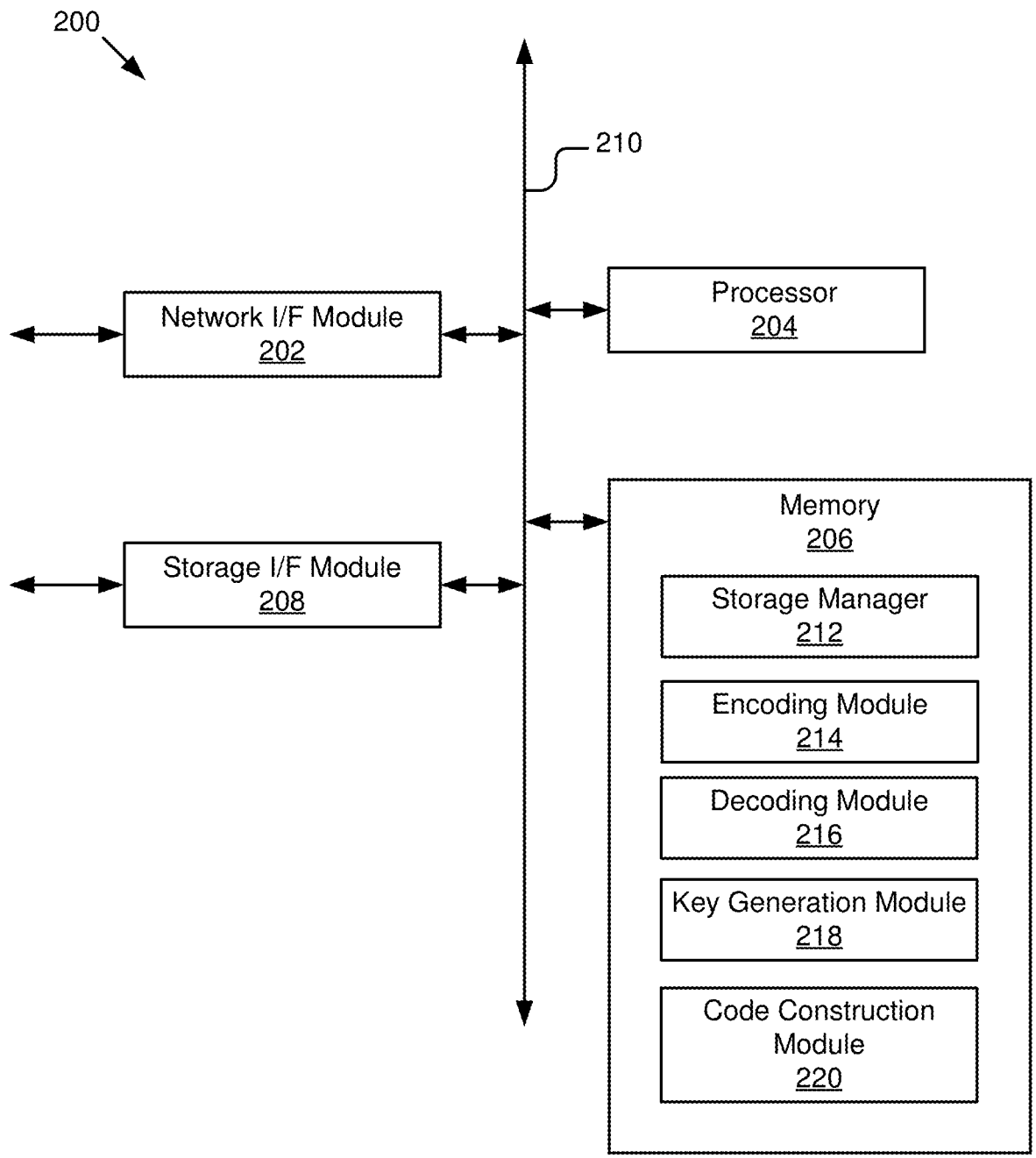
FIG. 2 is a block diagram illustrating an example system for use as a storage controller configured to implement techniques introduced herein.

FIG. 2 is a block diagram illustrating an example system 200 for use as a storage controller. In one embodiment, the system 200 may be a client device 102. In other embodiments, the system 200 may be a storage controller 106. In the example of FIG. 2, the system 200 includes a network interface (I/F) module 202, a processor 204, a memory 206, and a storage interface (I/F) module 208. The components of the system 200 are communicatively coupled to a bus or software communication mechanism 210 for communication with each other.

The network interface module 202 is configured to connect system 200 to a network and/or other system (e.g., network 104). For example, network interface module 202 may enable communication through one or more of the internet, cable networks, and wired networks. The network interface module 202 links the processor 204 to the network 104 that may in turn be coupled to other processing systems. The network interface module 202 also provides other conventional connections to the network 104 for distribution and/or retrieval of files and/or media objects using standard network protocols such as transfer control protocol/internet protocol (TCP/IP), HTTP, HTTP secure (HTTPS), and simple mail transfer protocol (SMTP) as will be understood. In some implementations, the network interface module 202 includes a transceiver for sending and receiving signals using Wi-Fi, Bluetooth®, or cellular communications for wireless communication.

The processor 204 may include an arithmetic logic unit, a microprocessor, a general purpose controller or some other processor array to perform computations and provide electronic display signals to a display device. In some implementations, the processor 204 is a hardware processor having one or more processing cores. The processor 204 is coupled to the bus 210 for communication with the other components. Processor 204 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 2, multiple processors and/or processing cores may be included. It should be understood that other processor configurations are possible.

The memory 206 stores instructions and/or data that may be executed by the processor 204. In the illustrated implementation, the memory 206 includes a storage manager 212 and an encoding module 214. Although depicted as distinct modules in the example of FIG. 2, the storage manager 212 may include the encoding module 214, decoding module 216, key generation module 218, and code construction module 220, or perform the functions of the modules 214, 216, 218, and 220 as described herein. The memory 206 is coupled to the bus 210 for communication with the other components of the system 200. The instructions and/or data stored in the memory 206 may include code for performing any and/or all of the techniques described herein. The memory 206 may be, for example, non-transitory memory such as a dynamic random access memory (DRAM) device, a static random access memory (SRAM) device, flash memory, or some other memory devices. In some implementations, the memory 206 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device.

Software communication mechanism 210 may be an object bus (e.g., common object request broker architecture (CORBA)), direct socket communication (e.g., TCP/IP sockets) among software modules, remote procedure calls, user datagram protocol (UDP) broadcasts and receipts, HTTP connections, function or procedure calls, etc. Further, any or all of the communication could be secure (secure shell (SSH), HTTPS, etc.). The software communication mechanisms can be implemented on any underlying hardware, for example, a network, the Internet, a bus, a combination thereof, etc.

The storage I/F module 208 cooperates with the storage manager 212 to access information requested by the client 102. The information may be stored on any type of attached array of writable storage media, such as hard disk drive (HDD), magnetic tape, optical disk (e.g., compact disk-read only memory (CD-ROM) or digital versatile disk (DVD)), flash memory, solid-state drive (SSD), electronic random access memory (RAM), micro-electro mechanical and/or any other similar media adapted to store information, including data and parity information. However, as illustratively described herein, the information is stored on drives, such as SSDs or HDDs. The storage I/F module 208 includes a plurality of ports having input/output (I/O) interface circuitry that couples with the drives over an I/O interconnect arrangement.

The storage manager 212, stored on memory 206 and configured to be executed by processor 204, facilitates access to data stored on the storage devices 112. In certain embodiments, the storage manager 212 logically organizes data as a hierarchical structure of named directories and files on the storage devices 112. The storage manager 212 cooperates with the encoding module 214 to encode data stored on the disks for recovery in the event of a failure of one or more disks. The storage manager, in some embodiments, may detect a failure of a disk and cooperate with the encoding module 214 to recreate the data stored on the failed disk.

Encoding module 214 may be stored in memory 206 and executed by processor 204. The encoding module 214 is configured to generate parity data for each message based on a particular encoding scheme. Similarly, decoding module 216 may be stored in memory 206 and executed by processor 204. The decoding module 216 is configured to decode an encoded message based on the particular encoding scheme. Various encoding schemes may be used, such as Bose-Chaudhuri-Hoquenghem (BCH) code, Maximum Distance Separable (MDS)/Reed-Solomon (RS) codes, and Low-Density Parity Check (LDPC) codes.

A key generation module 218 may be stored in memory 206 and executed by processor 204. The key generation module 218 is configured to generate a secret key using various cryptographic methods.

A code construction module 220 may be stored in memory 206 and executed by processor 204. The code construction module 220 is configured to construct a code as described further with respect to FIGS. 3B & 3C. The properties of the constructed code should decode to a valid word based on the particular ECC schema. Additionally, no additional storage should be required and a high level of security is needed to prevent an adversary from modifying a message.

Figure 3A:
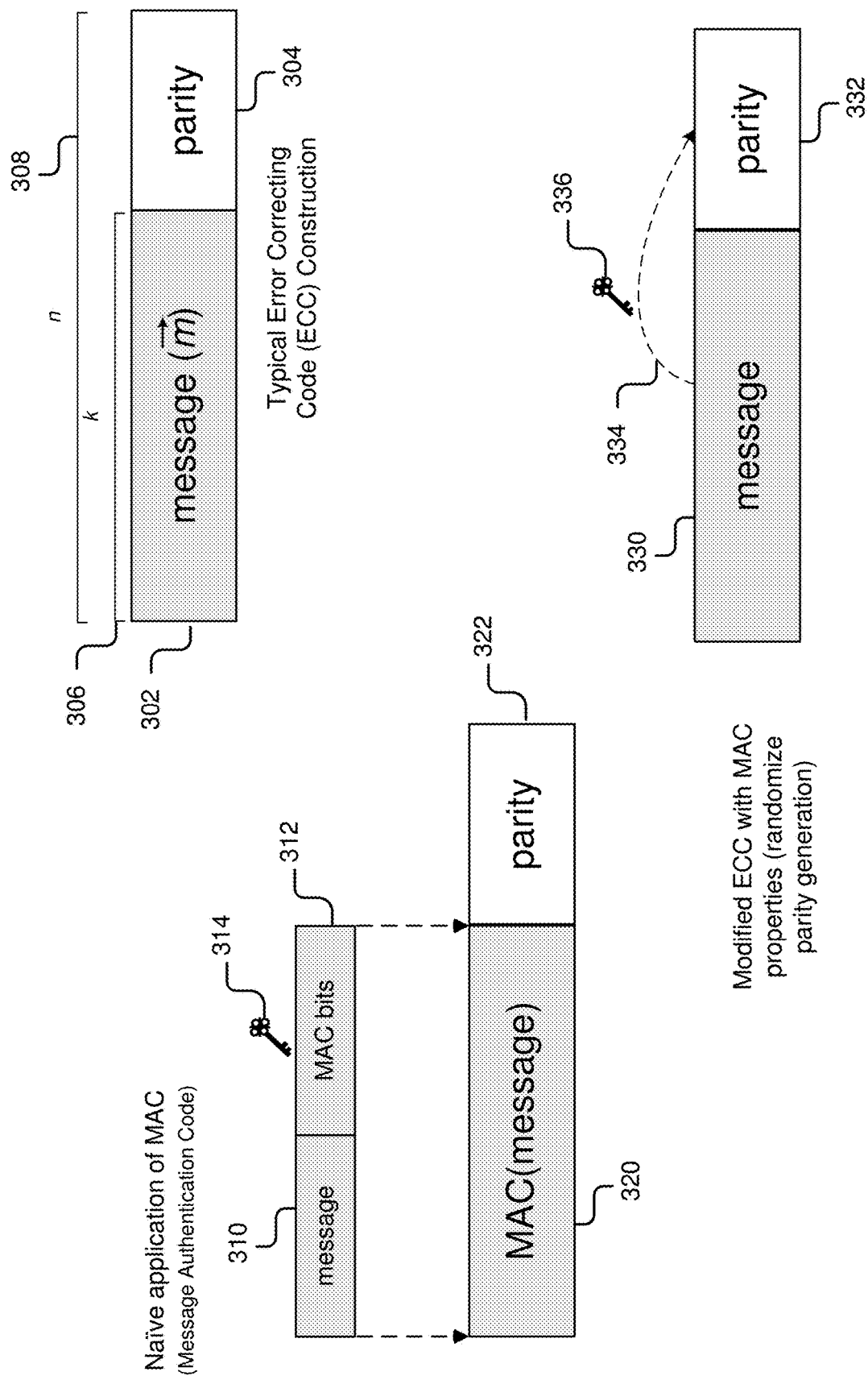
FIG. 3A is a block diagram illustrating various approaches for message authentication, according to the techniques described herein.

As illustrated in FIG. 3A, a typical error correcting code construction includes a message ($\vec{m}$) 302 of length (k) 306 and a parity code 304 that is appended to the message such that the constructed code has a length (n) 308. An existing approach of applying a message authentication code (MAC) to the message 310 employs a key 314 that is used to generate a set of MAC bits 312 that are applied as a tag to message 310. The message 310 and the MAC bits 312 are appended to form the MAC (message) 320. A parity code 322 is generated for the MAC (message) 320 with the regular ECC. This naive application of MAC requires additional storage (in the form of the MAC bits), resulting in a degradation of storage capability. For example, this naive application of MAC requires an additional λ bits for security, such that the probability that an adversary wins (e.g., picking a string of bits that will decode properly) can be expressed as Pr [$\mathcal{A}$ wins]<$2^{-\lambda}$. With various codes, this degrades the storage capability, e.g., when λ=30, for an example binary-BCH code with parameters [1023 (640), 903 (520→490), 12], the result is a 5.8% reduction in storage capacity. Thus, even though the level of security, as measured by the likelihood of an adversary's success (Pr [$\mathcal{A}$ wins]), is less than $2^{-30}$, there is a cost in storage capacity for the 30 bits of MAC bits (490=520–30).

Message Authentication Codes (MACs) are typically based on symmetric cryptography, allowing fast and efficient computation, especially on Electronic Control Units (ECUs) with limited computational power found in automotive components, for example. FIG. 3A further illustrates a modified ECC with MAC properties such that the MAC will perform error correcting operations. For example, the error correcting code may be embedded into the MAC where a random and secret ECC is selected from a set of codes with a chosen parameter triplet (N, K, t) comprised of an n parameter, a k parameter, and a t parameter. The receiver, knowing the symmetric key, can identify the actual code and run the error correction algorithm and remove the channel errors in the received packet. Then, the receiver verifies the MAC on the error-free packet. This enables the message 330 to be embedded with a secret key 336 such that the parity 332 generated is based on the secret ECC 334. In this way, the elements of the root set of the (MAC/ECC) generator polynomial are in fixed algebraic relation according to the definition of the ECC code. However, even with various improvements in this approach, the amount of security provided is not satisfactory because, for example, binary-BCH [1023, 903, 12] provides only 1/600 or approximately $2^{-9}$ security. Thus, because additional security is required, other code constructions are described with respect to FIGS. 3B and 3C.

Figure 3B:
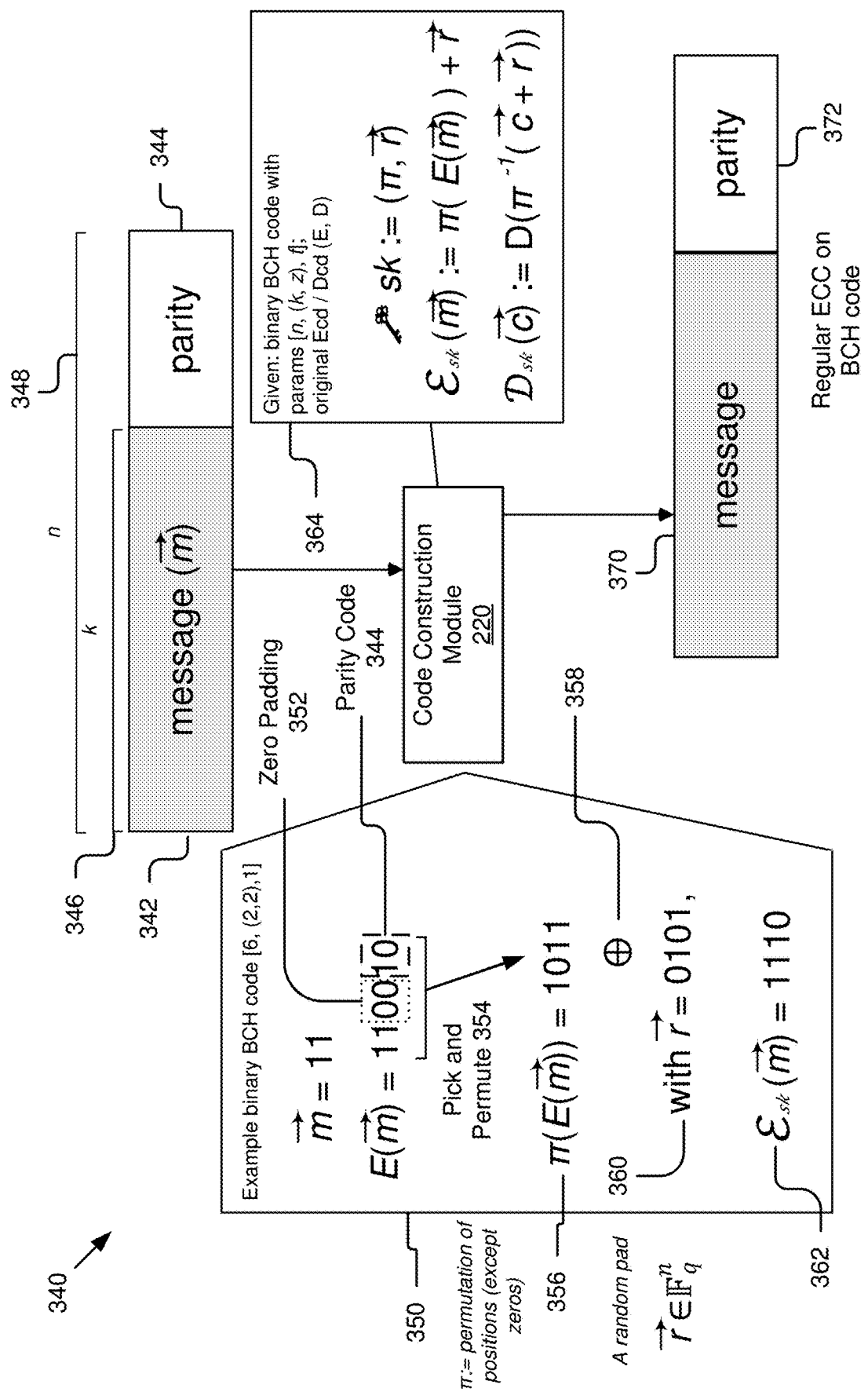
FIG. 3B is a block diagram illustrating an example storage-free message authentication scheme for an error-correcting-code.

FIG. 3B is a block diagram illustrating an example storage-free message authentication scheme 340 for an error-correcting-code. The encoding module 214 uses this example storage-free message authentication scheme 340 in a scenario where binary BCH code is being used as the original encoding scheme with parameters [n, (k, z), t] where the original encoding (Ecd) and decoding (Dcd) is notated below as Ecd/Dcd (E, D), where parameter z represents the number of zeroes to pad to message ($\vec{m}$) 342 in encoding, and where t represents a maximum number of error corrections. A message ($\vec{m}$) 342 has a length (k) 346 and a parity code 344 such that the constructed code has a length (n) 348. In this example scheme 340, $\vec{1}$ is always a valid word and an adversary A can modify the message $\vec{m}$ 342 by adding $\vec{1}$. The code construction module 220 receives the information about the message ($\vec{m}$) 342 having a length (k) 346 and a parity code 344 such that the constructed code has a length (n) 348. Thus, this scheme 340 uses a new encoding/decoding schema 364 with a secret key and a permutation of the nonzero elements in the message combined with a random pad, as encompassed in this equation:

$$\varepsilon_{sk}(\vec{m}) := \pi(E(\vec{m})) + \vec{r} \quad \text{[Equation 1]}$$

For example, an example request for storage-free message authentication provided to the code construction module 220 may include the following: "binary BCH code [6, (2,2), 1]" as shown in pseudocode 350. For a message ($\vec{m}$) 342 where $\vec{m}$=11, applying the original encoding E to that message results in: E($\vec{m}$)=110010 because the original message is "11" which is appended to zero padding 352 and a parity code 344 of "10" as shown in the pseudocode 350. The code construction module 220 then applies the new encoding/decoding schema 364 that uses a secret key. A secret key sk may be defined as sk:=($\pi$, $\vec{r}$) where $\pi$ is a random permutation of positions of the message including the parity code (except zeroes) that preserves the weight—the number of nonzero elements—of a word and $\vec{r}$ is a random pad where $\vec{r} \in \mathbb{F}_q^n$. Returning to the pseudocode 350, a permutation 356 of the original encoded message "110010" such that the nonzero elements are picked and permuted 354 to result in the following:

$$\pi(E(\vec{m}))=1011 \qquad \text{[Equation 2]}$$

This permutation 356 of ordinal positions is stored as a first part of the secret key sk, specifically as $\pi$, such that the permutation 356 can be reversed when decoding. For example, the original encoded message "110010" had '1's in the first, second, and fifth positions of the total length (n) of 6 ordinal positions. Suppose that the permutation 356 is such that the three '1's are picked and permuted 354 where the '1' in the first position is moved to the first position, the '1' in the second position is moved to the third position, and the '1' in the fifth position is moved to the fourth position. The random permutation 356 may be generated by the key generation module 218, in an embodiment. Thus, this permutation 356 of positions is saved so that it can be undone (i.e., inverted) during the decoding phase. Because this permutation 356 is secret, it is unlikely that an adversary can manipulate the message without being detected. This approach differs from prior approaches, such as a block cipher, that would swap a whole block of one size for another of the same size. For example, a traditional approach using block cipher that is indexed may swap "1011" for "0000." However, the technique described here permutes the non-zero elements at the bit level to preserve the weight of the codeword. The specific permutations may be stored as a block cipher using an index, in an embodiment.

The code construction module 220 then requests the key generation module 218 to select a random pad 360, r. The key generation module 218 may store the randomly selected pad (or randomly generated string of the same length, e.g., a one-time pad (OTP) cipher), in this example $\vec{r}$=0101, such that this random pad 360 operates as a second part of the secret key as defined above. Thus, the receiver of "1110" may exclusive-or (XOR) with the same random pad "0101" to decode it to "1011". This approach is extendible to multiple messages, in and embodiment, using different random pads $\vec{r}_i$. By using these two parts of the secret key sk, this new encoding scheme 340 beneficially provides a high level of security such that an adversary cannot manipulate a message that would properly decode into a valid word. This beneficially provides a high level of security similar to the naive application of MAC+ECC described above with respect to FIG. 3A (approximately 2-30) without the sacrifice in storage capacity. Without knowing $\pi$, the adversary $\mathcal{A}$ only knows that $\pi(\vec{w})$ is a random word of the Hamming weight of the word $\vec{w}$, HW=HW($\vec{w}$). However, the probability of an adversary's success, Pr [$\mathcal{A}$ success], can be computed approximately using heuristics for proof. Given that the weight distribution is known approximately for BCH code, on binary BCH [n=$2^m$−1, k=$2^m$−1−mt, t], the number of possible code words may be described as

(code of $wt = w$) ≈

$$\frac{\binom{n}{w}}{2^{mt}} + \text{assumption (similar but weaker property than } RS \text{ code)}$$

$$\#(\text{code of } wt = [w_1, 0]) \approx \#(wt = w_1) \cdot \frac{\binom{k}{w_1}}{\binom{n}{w_1}}$$

Returning to the example code construction illustrated in FIG. 3B, the permutation 356 ("1011") is combined ("⊕") with the random pad 360 ("0101") using an "exclusive or" (XOR) operation 358 ("⊕") that results in the newly encoded message 362, $\varepsilon_{sk}(\vec{m})$=1110. Using this newly encoded message 362, the code construction module 220 generates message 370 ("1110") and parity code 372 which is a regular ECC on BCH code.

As illustrated in FIG. 3B, the new encoding/decoding schema 364 employs the regular BCH code decoding schema D in the decoding module 216, as encompassed by this equation:

$$\mathcal{D}_{sk}(\vec{c}):=D(\pi^{-1}(\vec{c}+\vec{r})) \qquad \text{[Equation 3]}$$

For a code word $\vec{c}$, the code word $\vec{c}$ is combined with the saved random pad 360 $\vec{r}$ using the XOR operation. For example, "1110" is combined with "0101" using the XOR operation to result in "1011". Next, the inverse permutation $\pi^{-1}$ is performed on the result of the XOR operation on the code word $\vec{c}$ and the saved random pad 360 $\vec{r}$. Because the permutation 356 is saved by the code construction module 220, the decoding module 216 may access the saved permutation 356 and reverse it to perform the inverse permutation $\pi^{-1}$. Thus, in "1011," the '1' in the first position is restored to the first position, the '1' in the third position is restored to the second position, and the '1' in the fourth position is restored to the fifth position, resulting in "110010" which is a regular BCH code that can be decoded using decoding schema D may be performed on the result of the inverse permutation $\pi^{-1}$. As a result, the same error correction can be used and $\pi^{-1}$ preserves the Hamming weight (HW) of an error vector. In information theory, the Hamming weight of a string is the number of symbols that are different from the zero-symbol of the alphabet used. It is thus equivalent to the Hamming distance from the all-zero string of the same length. No additional storage is required for this message authentication scheme 340 while beneficially providing approximately the same level of security as a naive application of MAC+ECC.

Figure 3C:
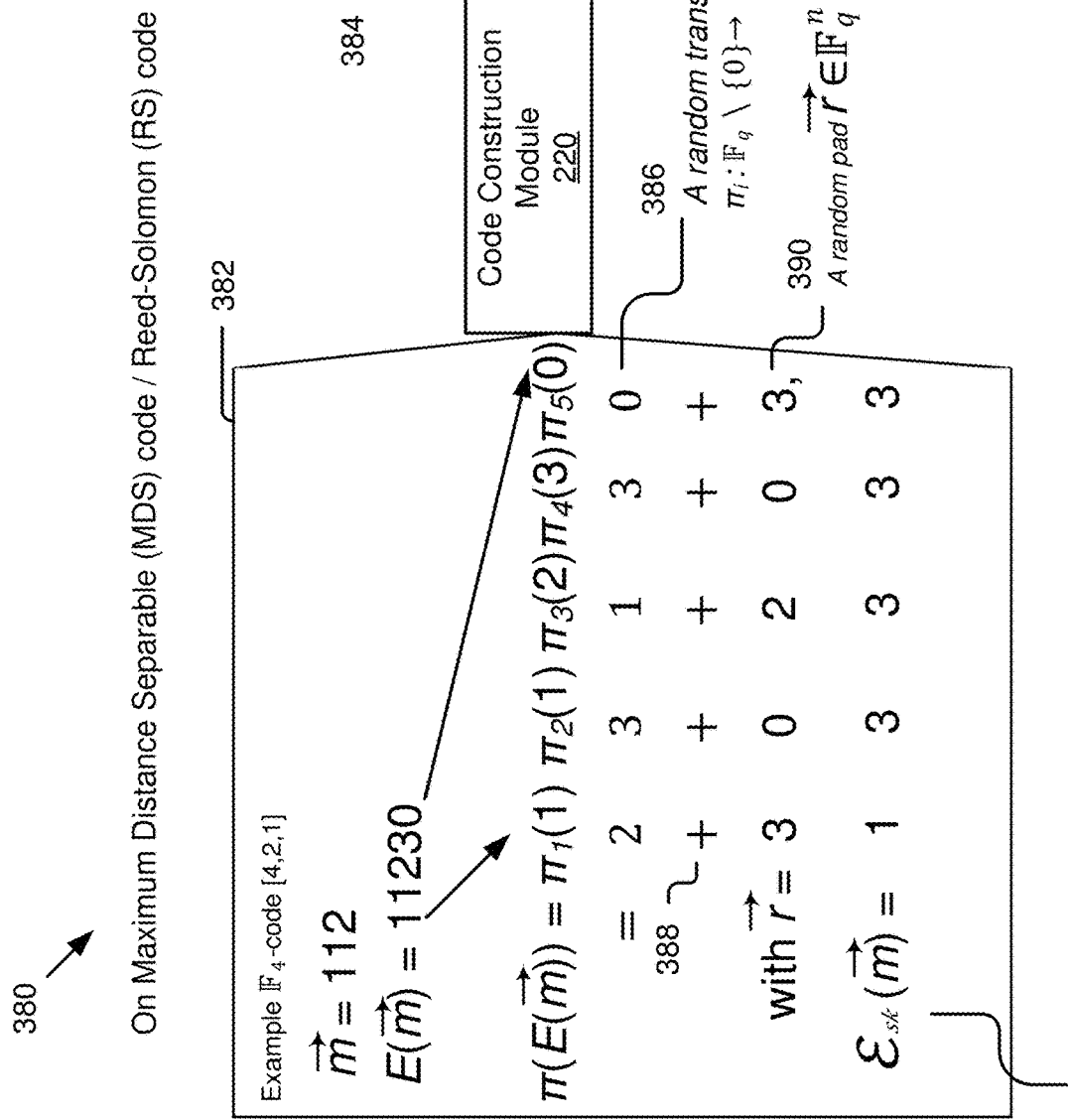
FIG. 3C is a block diagram illustrating another example storage-free message authentication scheme for an error-correcting-code.

FIG. 3C is a block diagram illustrating another example storage-free message authentication scheme 380 for an error-correcting-code. In this example storage-free message authentication scheme 380, Maximum Distance Separable (MDS) code/Reed-Solomon (RS) code is being used as the original encoding scheme, given $\mathbb{F}_q$-RS code with parameters [n, k, t] where the original encoding (Ecd) and decoding (Dcd) is notated below as Ecd/Dcd (E, D) and where t represents a maximum number of error corrections. An MDS Code or RS Code uses a larger alphabet (e.g., a larger field $\mathbb{F}$ where an alphabet size parameter q=4, where the alphabet is {0, 1, 2, 3}) instead of just '0's and '1's as in binary BCH code. The code construction module 220 processes this information, as shown in the encoding/decoding schema 384 for MDS/RS code, and performs pseudocode 382 for an example request for storage-free message authentication on MDS/RS code. A secret key sk may be defined as sk:=($\pi$, $\vec{r}$), where n:=($\pi_1$, $\pi_2$, ..., $\pi_n$) such that $\pi$ is a pseudo-random transposition 386 derived from a key generated by the key generation module 218, in an embodiment. This pseudo-random transposition 386 may be described by the expression $\pi_i$: $\mathbb{F}_q\setminus\{0\} \to \mathbb{F}_q\setminus\{0\}$ such that $\pi$ preserves the weight, or the number of nonzero elements, of the word. Because this is a larger field, the pseudo-random transposition 386 is permuting the representation of the field, in an embodiment. Additionally, $\vec{r}$ is a random pad 390, or a random string of characters derived from a key having the same length of the code, where $\vec{r} \in \mathbb{F}_q^n$. Here, the random pad 390 may be generated by the key generation module 218, for example.

Here, an example request to the code construction module 220 may include the following: "$\mathbb{F}_4$-RS code [4,2,1]" as shown in pseudocode 382. For a message ($\vec{m}$) where $\vec{m}$=112, applying the original encoding E (using MDS code) to that message results in: E($\vec{m}$)=11230, adding two parities '3' and '0'. Thus, applying the random transposition $\pi$ to E($\vec{m}$) may be expressed as:

$$\pi(E(\vec{m}))=\pi_1(1)\pi_2(1)\pi_3(2)\pi_4(3)\pi_5(0) \quad \text{[Equation 4]}$$

The results of the random transposition 386, as illustrated in the pseudocode 382, is 23130, where $\pi_1(1)$ is mapped to '2', $\pi_2(1)$ is mapped to '3', $\pi_3(2)$ is mapped to '1', $\pi_4(3)$ is mapped to '3' and $\pi_5(0)$ is mapped to '0' as determined by the pseudo-random transposition derived from a key. This is combined with a random pad 390 $\vec{r}$ that is generated by the key generation module 218 where $\vec{r} \in \mathbb{F}_q^n$. Here, $\vec{r}$=30203. The two vectors are then combined at the symbol-level, using a modulo operation 388. The modulo operation 388 employed here is "A+B modulo 4," where A represents the symbol being combined of the first code, B represents the symbol being combined of the second code, and 4 is used because the field size in this example is 4. The modulo operation of integers x and y (e.g., x mod y) returns the remainder after dividing x by y. Thus, for the first element, 2+3 is 5, and 5 modulo 4 is 1. For the second element, 3+0 modulo 4 is 3. For the third element, 1+2 modulo 4 is 3. For the fourth element, 3+0 modulo 4 is 3. And for the fifth element, 0+3 modulo 4 is 3. The resulting word is "13333" which is stored in the media as the newly encoded message 392.

A decoding module 216 may implement the new encoding/decoding schema 384 such that given a code word $\vec{c}$, the saved random pad 390 $\vec{r}$ ("30203") is subtracted from $\vec{c}$, symbol by symbol. Thus, for code word $\vec{c}$=13333, the first element '1' subtract '3' results in '2'. Similarly, the second element '3' subtract '0' results in '3'. For the third element, '3' subtract '2' results in '1'. For the fourth element, '3' subtract '0' results in '3'. For the fifth element, '3' subtract '3' results in '0'. Thus, the result of subtracting the random pad 390 $\vec{r}$ ("30203") from the code word $\vec{c}$ ("13333") is "23130." Then, the inverse transposition $\pi^{-1}$ is performed on "23130" that would result in "11230." Using the ECC decoding schema of the MDS/RS code, the message would be identified as 112. If, for some reason, there was a bit flip, due to some error, that caused the encoded message of "13333" to be stored as "03333", the subtraction of the random pad 390 $\vec{r}$ ("30203") from the bit-flipped code word $\vec{c}$ ("03333") would be "33130". Then, applying the inverse transposition $\pi^{-1}$ to "33130" would result in "21230" as the erroneous word, as an example, using the pseudo-random mapping derived from the key. The regular ECC decoding schema of MDS/RS would correct that erroneous vector "21230" to correctly generate "11230" as the originally encoded word. Thus, the random pad $\vec{r}$ would not impact the ECC decoding schema and error correction is the same as the original encoding/decoding (E/D). Additionally, the permutation $\pi^{-1}$ preserves the Hamming weight (HW) of an error vector $\vec{\delta}$. As illustrated by the example above in which the encoded message was modified by an error vector $\vec{\delta}$, the situation may be expressed as $\mathcal{D}_{sk}(\varepsilon_{sk}(\vec{m})+\vec{\delta})$= $\mathcal{D}_{sk}(\pi(E(\vec{m}))+\vec{r}+\vec{\delta})$ which can be evaluated as $D(E(\vec{m})+\pi^{-1}(\vec{\delta}))$, or the original decoding scheme D applied to both the originally encoded message E($\vec{m}$) and the permutation $\pi^{-1}$ applied to the error vector $\vec{\delta}$, or $\pi^{-1}(\vec{\delta})$. Thus, the result of D(E($\vec{m}$)+$\pi$-1 ($\vec{\delta}$)) is $\vec{m}$ if HW($\pi^{-1}(\vec{\delta})$)=HW($\vec{\delta}$)≤t.

A combinatorial analysis may be performed to compute the level of security attained by using the techniques described herein. An adversary $\mathcal{A}$ can modify a valid word $\vec{c}$ to another valid word $\vec{c}'$ (with different message) only if it can output a word $\vec{w}$ such that D($\pi(\vec{w})$)=$\vec{m} \neq \vec{0}$. Without knowing $\pi$, $\mathcal{A}$ can not specify $\pi(\vec{w})$, only knows that $\pi(\vec{w})$ is a random word whose weight is the same as that of $\vec{w}$. For each weight, we can compute (with weight distribution of given ECC) the probability Pr[a random word of given weight is a valid word, i.e., D($\vec{w}$)=$\vec{m} \neq \vec{0}$]. Thus, the probability of the adversary success is less than or equal to the maximum probability of a random word of weight n is a valid word, or Pr [$\mathcal{A}$ success]≤ $\overset{max}{\eta}$ Pr [random word of weight $\eta$ is a valid word]. On RS code, (partition) weight distribution is known explicitly, such that the all the probabilities can be computed. Additionally, less randomization is sufficient with the larger field than binary BCH code such that permuting the positions of each element is not needed for RS code. Thus, there are significant advantages over prior approaches using the techniques described herein. For example, the prior approach of a naive MAC+ECC code construction that uses an MDS/RS code with parameters of $\mathbb{F}_{2^8}$-RS code [n, k, t]=[35, 13→6, 11] results in a message size (in bytes) of 6, a 54% reduction in storage capacity. While the naive MAC+ECC code construction provides a security level of $2^{-56}$ (=$2^{-8 \cdot 7}$), the cost is quite high in terms of degradation of storage capacity. Meanwhile, the techniques described herein provide a similar, if not greater, level of security as measured by the likelihood of adversary success of $2^{-59}$.

Figure 4:
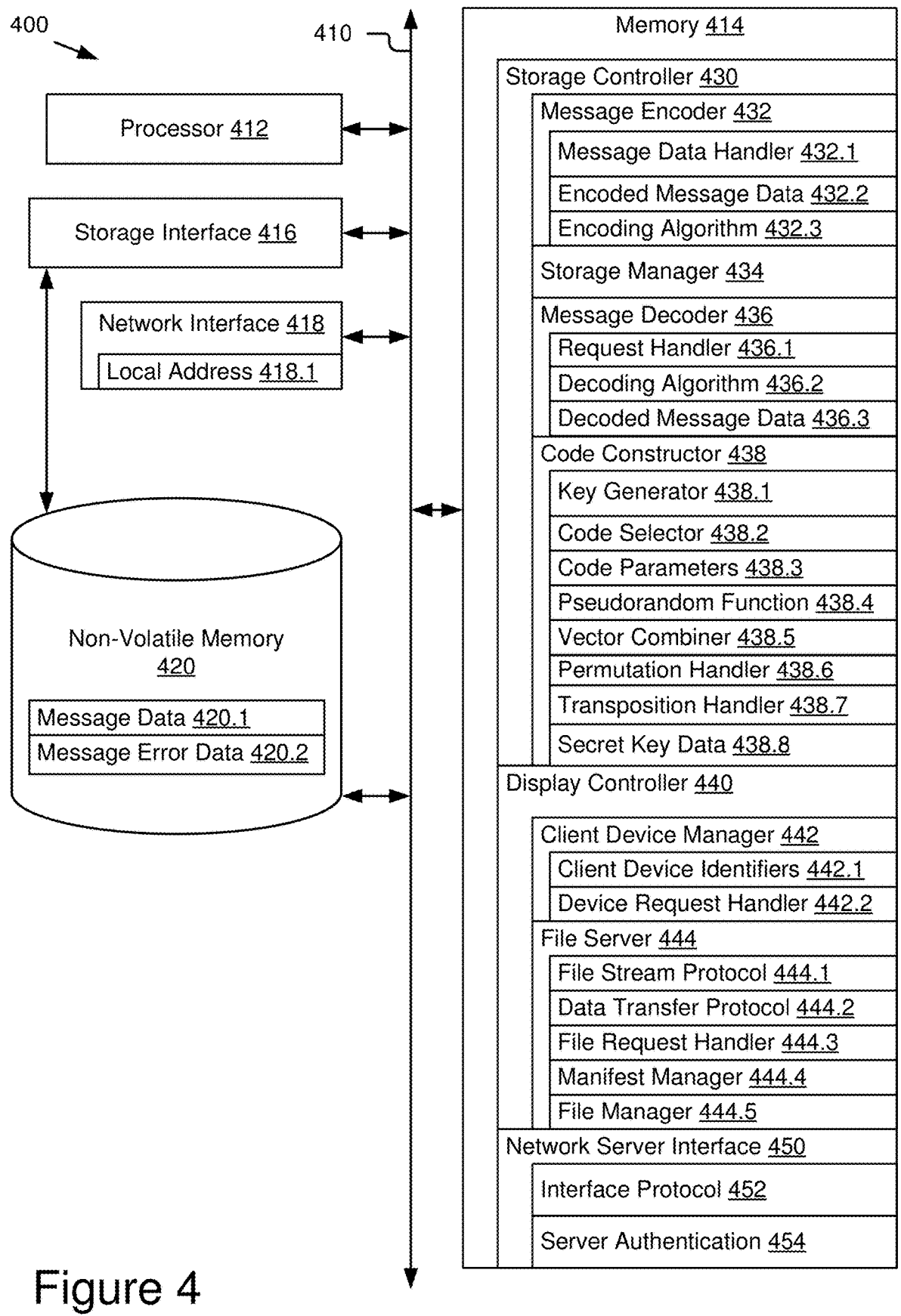
FIG. 4 schematically illustrates elements of the example system of FIG. 2, according to the techniques described herein.

FIG. 4 is a block diagram that schematically illustrates elements of the example system of FIG. 2, according to the techniques described herein. Storage system 400 may incorporate elements and configurations similar to those shown in FIGS. 1-2. For example, storage system 400 may be configured in a plurality of storage devices similar to storage devices 112. In some embodiments, one or more of the selected modules may access or be instantiated in the processors, memories, and other resources of computing devices configured for storage, similar to storage devices 112. For example, a storage device that is embedded in or attached to a computing device may be configured with some or all functions of storage controller 430, display controller 440, and/or network server interface 450 to provide data storage and peer-to-peer storage capabilities in a distributed fashion at the edge of storage system 300. In some embodiments, each storage device in storage system 400 may be configured with the elements shown in FIG. 4.

Storage system 400 may include a bus 410 interconnecting at least one processor 412, at least one memory 414, and at least one interface, such as storage interface 416 and network interface 418. Bus 410 may include one or more conductors that permit communication among the components of storage system 400. Processor 412 may include any type of processor or microprocessor that interprets and executes instructions or operations. Memory 414 may include a random access memory (RAM) or another type of dynamic storage device that stores information and instructions for execution by processor 412 and/or a read only memory (ROM) or another type of static storage device that stores static information and instructions for use by processor 412 and/or any suitable storage element such as a hard disk or a solid state storage element. In some embodiments, processor 412 and memory 414 may be compute resources available for execution of logic or software instructions stored in memory 414 and computation intensive tasks may be configured to monitor and share these resources.

Storage interface 416 may be configured to provide a data storage interface for storing data in multiple storage devices. Storage interface 416 may include a physical interface for connecting to one or more internal and/or removable storage devices using an interface protocol that supports storage device access. For example, storage interface 416 may include a peripheral component interface express (PCIe), serial advanced technology attachment (SATA), small computer serial interface (SCSI), serial attached SCSI (SAS), universal serial bus (USB), Firewire, secure digital (SD), extended secure digital (XSD), or similar storage interface connector supporting storage protocol access to some or all of non-volatile memory 420. Depending on the configuration and protocols used by storage interface 416, non-volatile memory 420 may include a corresponding interface adapter, firmware, and/or protocols for receiving, managing, and responding to storage commands from the storage system 400. In some embodiments, non-volatile memory 420 may include a removable data storage device, such as an SD card, and storage interface 416 may include hardware (slot and conductor configuration) and software for storing to and reading from the removable data storage device.

Network interface 418 may include one or more wired or wireless network connections to network, similar to network 104. Network interface 418 may include a physical interface, such as an ethernet port, and related hardware and software protocols for communication over the network, such as a network interface card or wireless adapter. In some embodiments, network interface 418 may connect a storage device to a LAN or directly to a network address translation (NAT) device, such as a gateway, router, or network switch, for connecting to another network, such as the internet. Network interface 418 may be configured with one or more local network addresses 418.1 corresponding to one or more ports for sending and receiving network communications. In some embodiments, local network address 418.1 may be used by the NAT device and/or other storage system components connected to the NAT device for directing local network communication, with the NAT device providing one or more IP addresses for sending and receiving network communication over the internet.

Storage system 400 may include one or more non-volatile memory devices 420 configured to store data. For example, non-volatile memory devices 420 may include a plurality of flash memory packages organized as an addressable memory array and/or one or more solid state drives or hard disk drives. In some embodiments, non-volatile memory devices 420 may include a plurality of storage devices within or attached to the computing systems for storing and accessing data.

Storage system 400 may include a plurality of modules or subsystems that are stored and/or instantiated in memory 414 for execution by processor 412 as instructions or operations. For example, memory 414 may include a storage controller 430 configured to enable a computing device to store data in non-volatile memory 420 and/or memory 414. Memory 414 may include a display controller 440 configured to stream data to requesting devices, such as a SaaS server, client device, or other component of storage system 400. Memory 414 may include a network server interface 450 configured to provide a network interface for accessing and managing data on the computing devices from a SaaS server, application, or other access point for a group of computing devices.

Storage controller 430 may include interface protocols, functions, parameters, and data structures for storing data within each storage device. For example, storage controller 430 may be an embedded firmware application and corresponding hardware in a storage device configured to store data for selective access through a SaaS server and/or an application on a client device. Storage controller 430 may be configured as an interface between data stored by an application 108 and one or more storage devices 112 for redundancy and data protection purposes.

Storage controller 430 may include storage interface protocols and a set of functions, parameters, and data structures for receiving data from one or more applications. For example, storage controller 430 may include data channels and related data buffers for managing at least one data stream. In some embodiments, storage controller 430 may include a plurality of hardware and/or software modules configured to use processor 412 and memory 414 to handle or manage defined operations of storage controller 430. For example, storage controller 430 may include a message encoder 432, a storage manager 434, a message decoder 436, and a code constructor 438.

In some embodiments, storage controller 430 may include one or more message encoders 432 configured to encode message data, such as raw data from an application, in a desired error correcting code (ECC) format. For example, message encoder 432 may receive raw message data that may be encoded in various formats, such as binary-BCH code, MDS/RS code, and Low-Density Parity Check (LDPC) codes. In some embodiments, message encoder 432 may be configured to generate parity codes based on given parameters.

Storage manager 434 may include storage interface protocols and a set of functions, parameters, and data structures for managing storage of data in non-volatile memory 420, for later retrieval and use by the computing device's onboard analytics, display through display controller 440 and/or access, display, and/or transfer to other systems through network server interface 450. For example, storage manager 434 may write data from streaming data buffers and/or storage path data from message encoder 432 to non-volatile memory 420 as message data 420.1. In some embodiments, storage manager 434 may support message encoder 432 and/or message decoder 436 to retrieve data from non-volatile memory 420 and/or access other data stored on memory 414 to be encoded and/or decoded and sent to another device, such as a client device. For example, storage manager 434 may store data in various encoded formats, such as BCH code, MDS/RS code, and LDPC codes, using message encoder 432. A request for message authentication may be handled by message data handler 432.1 to transform a message into encoded message data 432.2 using an encoding algorithm 432.3 as described above with respect to FIGS. 1-3C. Similarly, storage manager 434 may retrieve data that has been stored in various encoded formats and may use message decoder 436 to decode the message. A request to decode a message may be handled by request handler 436.1, for example. Using a decoding algorithm 436.2, as described above with respect to FIGS. 1-3C, an encoded message may be transformed into decoded message data 436.3.

In some embodiments, storage manager 434 may be configured to manage storage space in non-volatile memory 420 in accordance with one or more data protection and/or data redundancy schemes. For example, storage system 400 may support storing data from various applications and storage manager 434 may include logic for enforcing a data protection and/or data redundancy schemes whereby the fixed storage space of non-volatile memory 420 is replicated across one or more storage devices accessible through the storage interface 416 according to the data protection and/or data redundancy schemes. In some embodiments, storage manager 434 may also generate message error data 420.2 as tags or metadata embedded within the data or in an associated metadata table, file, or similar data structure associated with the corresponding data objects. In some embodiments, storage manager 434 may be configured to store message error data 420.2 descriptive of various errors and other information. For example, storage manager 434 may store, access, and/or generate error log files descriptive of message data 420.1 and indexed by timestamps.

A code constructor 438 may include interface protocols, functions, parameters, and data structures for generating a message authentication code (MAC) within an error correction code scheme, as described above with respect to FIGS. 1-3C. For example, after a message encoder 432 receives a request to apply MAC properties to a message, the message data handler 432.1 may request that the code constructor 438 generate a secret key that includes secret key data 438.8 generated by a key generator 438.1 that includes a pseudorandom function 438.4 to generate a particular permutation or transposition of bits or symbols in the message. A code selector 438.2 may be used to select an error code correction scheme as determined by the code parameters 438.3 included in the request to apply MAC properties to the message. For example, as described above with respect to FIG. 3B, the request may include binary-BCH code parameters 438.3 that include a length of the constructed code, a length of the message, and a tolerance of error bit flips. A vector combiner 438.5 may employ various methods and/or techniques to combine vectors, such as an XOR operation for binary BCH code or a modulo operation for MDS/RS code. A permutation handler 438.6 may handle the pseudo-random permutation of bits, as derived by an index using the pseudorandom function 438.4 and stored in the non-volatile memory 420 and/or memory 414. Similarly, a transposition handler 438.7 may handle a transposition of symbols for codes that have larger alphabets, such as MDS/RS code as described above with respect to FIG. 3C. The secret key data 438.8 may be stored in memory 414 and/or in non-volatile memory 420. The message decoder 436 will use the secret key data 438.8 to decode messages that have been encoded with MAC properties according to techniques described above.

Display controller 440 may include application protocol interfaces (APIs) and a set of functions, parameters, and data structures for streaming data to other devices, such as a client device with an internet browser or applications that have direct access to memory 414. For example, display controller 440 may provide one or more interfaces for receiving data requests through network interface 418 and streaming requested data through network interface 418. In some embodiments, display controller 440 may be configured to stream data to a client device using a peer network connection. For example, display controller 440 may receiving a connection request from a client device, directly or through a SaaS server, establish a secure peer network connection with the client device, and stream data for display on a browser of the client device. In some embodiments, display controller 440 may use a proxy server to establish the peer network connection to communicate data requests and responses to and from the client device using a different data transfer protocol than the data transfer protocols used by file server 444 and the client device's web browser. For example, file server 444 may be configured for HTTP/HTTPS data transfer of data and metadata compliant with HTML5 and stream control transmission protocol (SCTP) data transfer may be used over a secure socket connection between the two devices. In some embodiments, display controller 440 may include a plurality of hardware and/or software modules configured to use processor 412 and memory 414 to handle or manage defined operations of display controller 440. For example, display controller 440 may include a client device manager 442, a file server 444, and a proxy server (not pictured).

Client device manager 442 may include APIs and a set of functions, parameters, and data structures for managing peer network connection with one or more user devices. For example, user device manager 442 may be configured to receive client device connection requests and manage security, signaling, and socket establishment, as well as related reference information for establishing, maintaining, and terminating such connections. In some embodiments, client device manager 442 may operate in conjunction with network server interface 450 for receiving authorized connection requests and signaling channel information from a SaaS server or similar authorization server. In some embodiments, client device manager 442 may operate in conjunction with a proxy server for handshaking and negotiation of the peer network connection.

In some embodiments, client device manager 442 may be configured to use client device identifiers 442.1 for managing connection processing and related information for each client device that requests a connection. For example, each user device may have or be assigned a unique identifier when a new connection request is received by device request handler 442.2. In some embodiments, device request handler 442.2 may receive each new device connection request received through network server interface 450 and initiate a connection process corresponding to the connection request. For example, device request handler 442.2 may be configured to parse user device parameters, authorization parameters, signaling channel information and use that information to initiate proxy server to negotiate the new peer network connection.

File server 444 may include APIs and a set of functions, parameters, and data structures for responding to data streaming requests, such as hypertext transfer protocols (HTTP/HTTPS) requests from a browser, with data in a file and data transfer format compatible with the data handling of the browser. In some embodiments, media server 444 may be configured with a file stream protocol 444.1 defining the file formats, syntax, and parameters used for file requests, manifest files, and data transport files. For example, data stream protocol 444.1 may include .TS transport stream files and hypertext markup language (HTML)5 compatible file requests and manifest files for indexing time-based data streams. In some embodiments, file server 444 may be configured with a data transfer protocol 444.2 defining the messaging format and transport protocols for sending and receiving network communication. For example, data transfer protocol 444.2 may include HTTP/HTTPS data transfer over TCP/IP or a local transport equivalent.

In some embodiments, file server 444 may include a file request handler 444.3 configured to receive and process data requests from a requesting browser. For example, file request handler 444.3 may receive data request messages from the user device and parse them to determine the data request type and/or target data. If the file request is metadata request, file server 444 may use a manifest manager 444.4 to access and return the manifest file corresponding to the requested portion of the data stream (based on time indexing). If the file request is the streaming file request, file server 444 may use a file manager 444.5 to access and return the transport stream file corresponding to the requested portion of the data stream.

Network server interface 450 may include APIs and a set of functions, parameters, and data structures for interacting with a network server, such as a SaaS server. For example, network server interface 450 may include a monitoring or display configuration for displaying one or more data streams in real-time or near real-time on a graphical user display of a user device and/or receive file navigation commands from the client device to selectively display stored data from non-volatile memory 420 through a SaaS server. Network server interface 450 may be configured to support a software application when instantiated in the SaaS server, end user client device, network data storage, or another system accessible via a network within a LAN, WAN, virtual private network (VPN), or the internet. In some embodiments, network server interface 450 may be configured to support an interface protocol 452 based on network communication through the NAT device to the SaaS server and may include proprietary APIs and extensions to support the various functions of the SaaS server, such as data storage/archiving, data analysis and event detection, and selective display through one or more client devices. In some embodiments, network server interface 450 may provide an alternate path for accessing and displaying data from storage devices, compared to the peer network connection supported by display controller 440.

Network server interface 450 may include a server authentication function 454 for validating remote access to and from the networked storage devices. For example, secure connection to a SaaS server and/or software applications running on another device (such as an end user client device) may require each networked storage device to be configured with a set of mutually authenticated credentials for each remote connection. In some embodiments, a set of credentials and/or account credentials for the group of networked storage devices may be provided to each storage device, along with encryption keys or similar security elements, as well as network server identifier, such as a server name, internet protocol (IP) address, or other network routing information. For example, the set of credentials may enable an initial connection or configuration session and generate a secure authentication token stored to each networked storage device and/or a gateway for accessing the group of networked storage devices to enable automatic initiation of a secure data transfer connection between the storage devices and the software application (and its hosting device or devices).

In some embodiments, the software application may include a plurality of hardware and/or software modules configured to use a processor and a memory to handle or manage defined operations of the software application. For example, the software application may include a file stream manager, an alert manager, and an analytics manager.

The file stream manager may include APIs and a set of functions, parameters, and data structures for navigating and displaying data streams from the storage devices and stored through storage controller 430. For example, the file stream manager may include a graphical user interface and interactive controls for displaying lists, tables, thumbnails, or similar interface elements for selecting and displaying data streams for particular storage devices, times, locations, and/or events. In some embodiments, the file stream manager may include a data structure summarizing all data stored in storage system 400 to enable the user to locate and view older stored message data encoded with MAC properties. For example, a data management log or database may include entries for stored data indexed by related metadata, such as data parameters (e.g., time, location, encoding format, etc.), detected data event metadata (event time, location, type, parameters, etc.), and/or data management parameters (expiration, active/archive, access control, data protection and/or data redundancy schemes, etc.).

The alert manager may include APIs and a set of functions, parameters, and data structures for setting, monitoring, and displaying alerts based on detected events. For example, the user may define a set of trigger events that generate visual, audible, tactile, and/or notification-based (electronic mail, text message, automated call, etc.) alerts to a client device. In some embodiments, the alert manager may include a plurality of preset alert conditions with associated event parameters and allow a user to enable and disable alert types and/or change associated event parameters. In some embodiments, the alert manager may be configured to operate in conjunction with event overlay function to overlay graphical elements representing detected events or event indicators on data streams displayed through the file stream manager. For example, detected errors in files retrieved for display on the user device, where the detected errors are based on encoded data decoding to an invalid message, may trigger an alert through the alert manager. This may be due to an adversary application, as described above with respect to FIGS. 1-3C.

The analytics manager may include APIs and a set of functions, parameters, and data structures for selecting, training, and managing event detection algorithms. For example, the analytics manager may include a user interface to an analytical model library for one or more analytics engines, either in-storage device analysis subsystems or off-storage device analytics engines, such as those supported by the SaaS server. In some embodiments, the event detection algorithms may include a set of parameters and/or model weights that are preconfigured based on training data sets processed independent of storage system 400. For example, the analytics manager may include corrupted data detection algorithms for malware, viruses, situations, and data format configurations. In some embodiments, the analytics manager may include access to training services and/or preconfigured training data sets. For example, the analytics manager may enable the user to define training data sets for determining or refining event detection algorithm parameters and/or model weights based on predefined base algorithms or models. In some embodiments, the analytics manager may interface directly with an analytics engine for selecting, training, managing, and using the event detection algorithms configured through the analytics manager. Additionally, the analytics manager may interface with the storage manager 434 and message error data 420.2 to determine a source of potential adversary applications that have modified a message as described above with respect to FIGS. 1-3C, in an embodiment.

Figure 5:
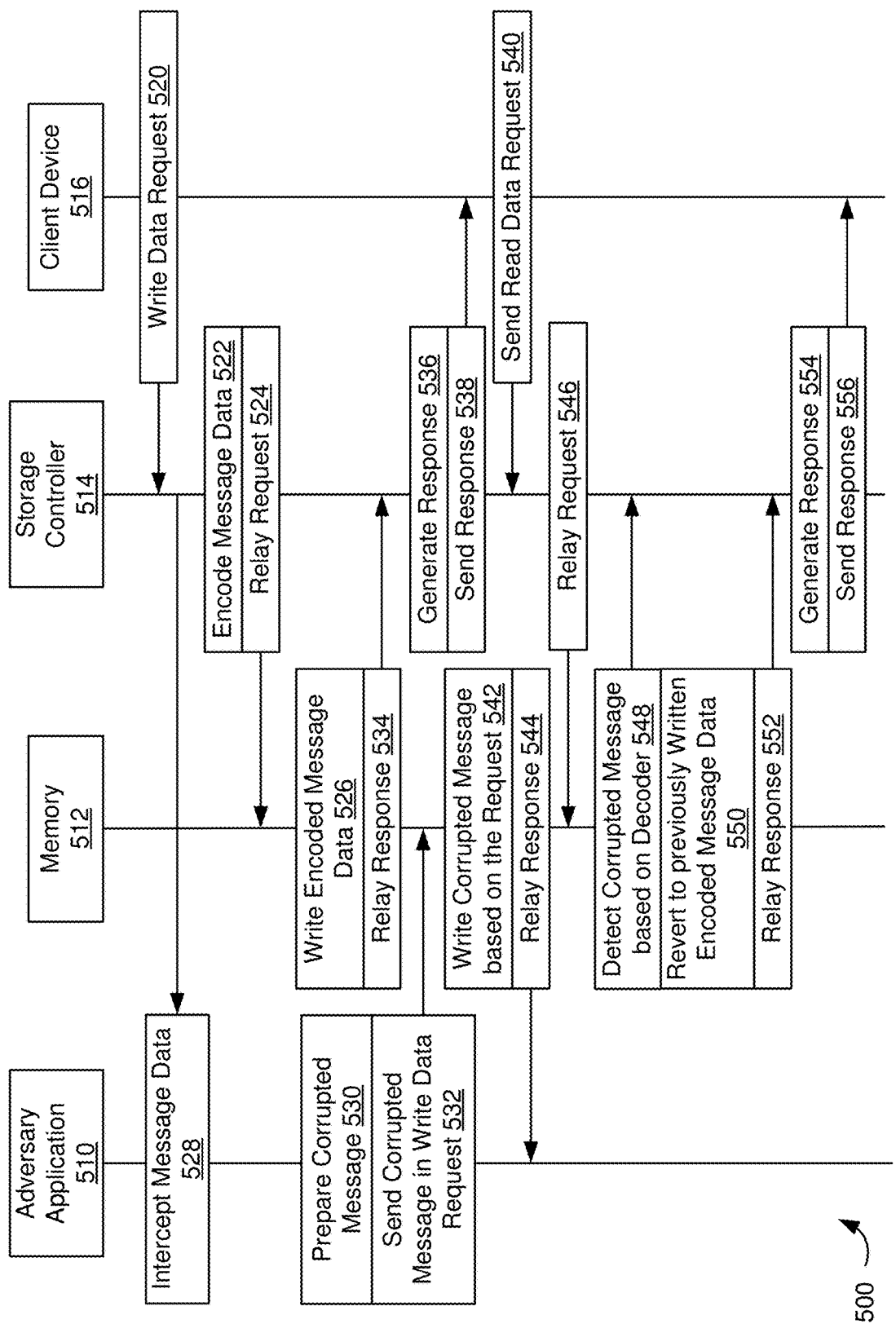
FIG. 5 is an interaction flow diagram of an example method for storage-free message authenticators for error-correcting-codes, according to the techniques described herein.

FIG. 5 is an interaction flow diagram of an example method for storage-free message authenticators for error-correcting-codes, according to the techniques described herein. Example method 500 illustrates a data interaction flow diagram between a client device 516, a storage controller 514, a memory 512, and an adversary application 510 similar to the system 100 of FIG. 1 and system 200 of FIG. 2, further described as system 400 of FIG. 4. A client device 516 may generate a write data request 520 that includes a request to apply the storage-free message authentication techniques described herein. This write data request 520 is received by storage controller 514. A notification of this write data request 520 may be intercepted by an adversary application 510, intercepting message data 528. Meanwhile, the storage controller 514 may encode message data 522 and relay request 524 to one or more modules on memory 512 to employ the storage-free message authentication techniques described above with respect to FIGS. 1-4, such as code construction module 220 and/or code constructor 438. As a result, in memory 512, the encoded message data is written 526 and a response is relayed 534 back to the storage controller 514. The storage controller 514 then generates a response 536 and sends the response 538 to the client device 516 to confirm that write data request 520 has been successfully completed.

The adversary application 510 may prepare a corrupted message 530 and send the corrupted message in a write data request 532 to the memory 512. Because the adversary application 510 has the requisite access and/or privileges to directly access memory 512, the corrupted message may be written based on the request at step 542, modifying the originally encoded message stored at step 526. The response to the request may be relayed at step 544 back to the adversary application 510 to confirm that the corrupted message has overwritten the originally encoded message.

At step 540, the client device 516 may send a read data request to the storage controller 514. This request may be relayed 546 to the one or more modules instantiated in memory 512, such as a storage manager 212 or storage manager 434. The storage manager 212 or storage manager 434 may use message decoder 436 to decode the requested message at memory 512. However, because the corrupted message has overwritten the originally encoded message, the message decoder 436 detects the corrupted message based on decoder at step 548. The message decoder 436 then reverts the file to the previously written encoded message data at step 548 based on the secret key stored in memory 512 or non-volatile memory 420 accessible through storage interface 416. In an embodiment, based on data protection and/or data redundancy schemes, the originally encoded message may be retrieved from a storage device that has not been corrupted by the adversary application 510. The response is relayed to the storage controller 514 at step 552 to include the originally encoded message data that has been decoded. The storage controller 514 then generates a response 554 and sends the response 556 to the client device 516. In an embodiment, a log of the error data may be stored at memory 512 or non-volatile memory 420 as message error data 420.2.

Figure 6:
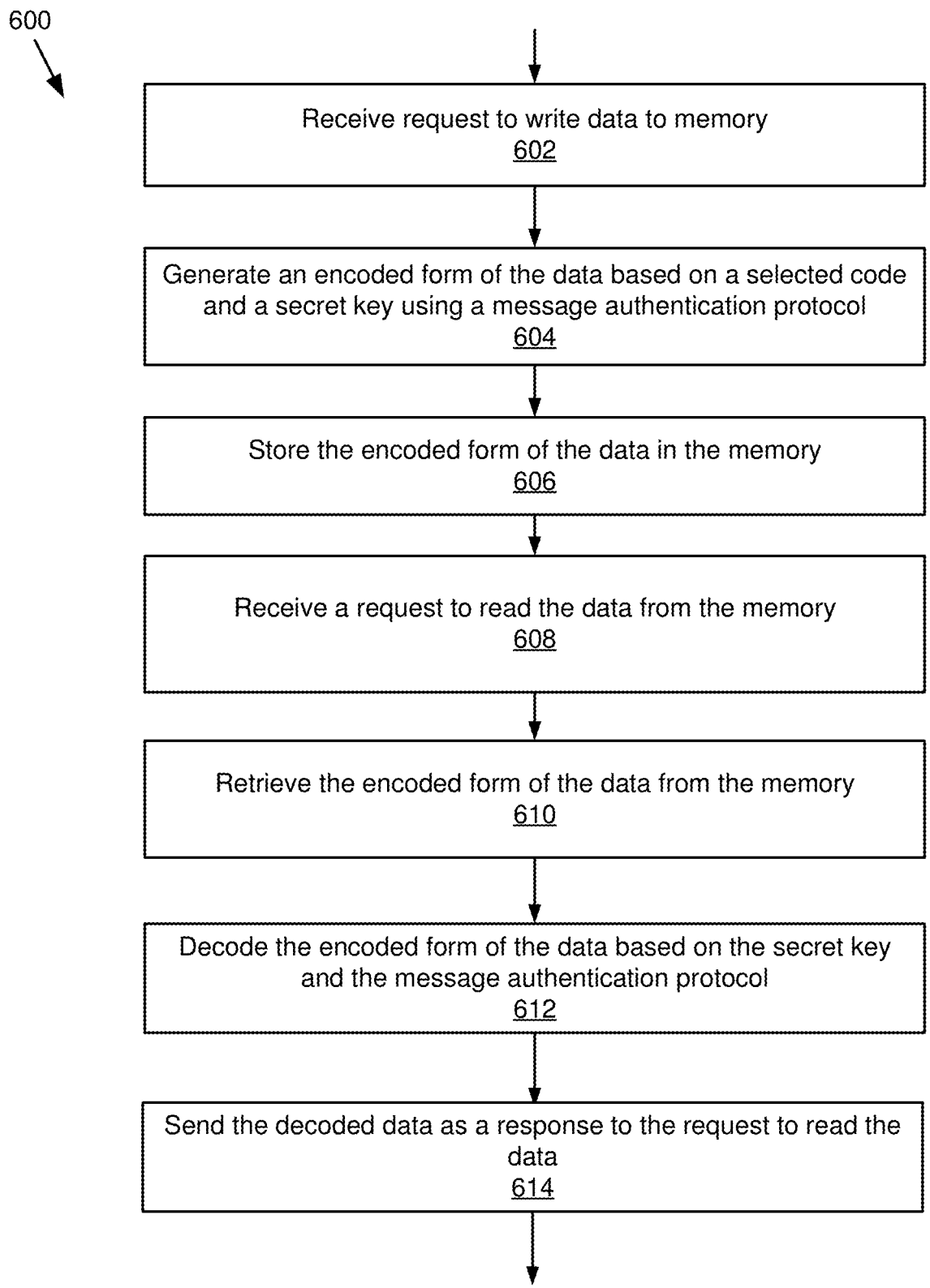
FIG. 6 is a flowchart of an example method for encoding and decoding a message using a message authentication protocol, according to the techniques described herein.

FIG. 6 is a flowchart of an example method 600 for encoding and decoding a message using a message authentication protocol, according to the techniques described herein. At 602, the encoding module 214 receives a request to write data to memory. In one embodiment, the memory may be a primary memory, for example, non-transitory memory such as a dynamic random access memory (DRAM) device and a static random access memory (SRAM). In one embodiment, the memory may include systematic nodes residing on separate disks. In another embodiment, the memory may include content stores residing on the same disk. The encoding module 214 may receive the request from a storage controller 106 and/or a storage manager 212 in response to a request to encode data. In some embodiments, the encoding module 214 may be configured to encode content as it is received from a client device 102 and stored to a storage device 112.

At 604, the encoding module 214 generates an encoded form of the data or encoded message based on a selected code and a secret key using a message authentication protocol, as described above in FIGS. 1-4. The encoding module 214 uses the code construction module 220 to calculate a parity code for the message included in the request to write data to memory. For example, the request includes a selected code, such as binary BCH code or MDS/RS code, and code parameters that describe criteria of the constructed code. A secret key is generated using the message authentication protocol associated with the selected code. For example, the message authentication protocol may include, as a first part of the secret key, a permutation of positions of non-zero bits in the encoded message according to the selected code, where the permutation is randomly generated using a pseudorandom function 438.4 as described above with respect to FIG. 3B for binary BCH code. The second part of the secret key may include a random pad generated by the key generator 438.1 selected from a field of valid strings of the same length as the output of the permutation, as also described above with respect to FIG. 3B for binary BCH code. Finally, the output of the permutation and the random pad are combined by a vector combiner 438.5, such as performing an XOR operation on each data element (e.g., bit, byte, block, etc.) of the output of the permutation and the random pad by position, as depicted in the example of FIG. 3B. Thus, the encoded form of the data is generated 604 based on the selected code and the secret key.

Returning to the example method of FIG. 6, the encoding module 214 stores 606 the encoded form of the data in the memory as a coded message. Then, the storage manager 212 receives 608 a request to read the data from the memory. In some embodiments, the data retrieval request to read the data may be received 608 from an application having direct access to the memory.

The storage manager 212 retrieves 610 the encoded form of the data from the memory as a coded message. The storage manager 212 uses the decoding module 216 to decode 612 the encoded form of the data based on the secret key and the message authentication protocol, as described in FIGS. 1-4. For example, the decoding module 216 may use XOR, inverse transposing operations, and/or ECC decoding to determine the decoded data. In some embodiments, the encoded form of the data cannot be validly decoded because an adversary application has modified and/or corrupted the encoded form of the data, thus providing an indication that the originally encoded data has been tampered with. This indication that the encoded form of the data cannot be validly decoded may be sent as a response to the request at step 614, in an embodiment. In another embodiment, the encoded form of the data is validly decoded at step 612 using the secret key and the message authentication protocol described in FIGS. 1-4. The decoded data is then sent 614 as a response to the request to read the data.

Figure 7:
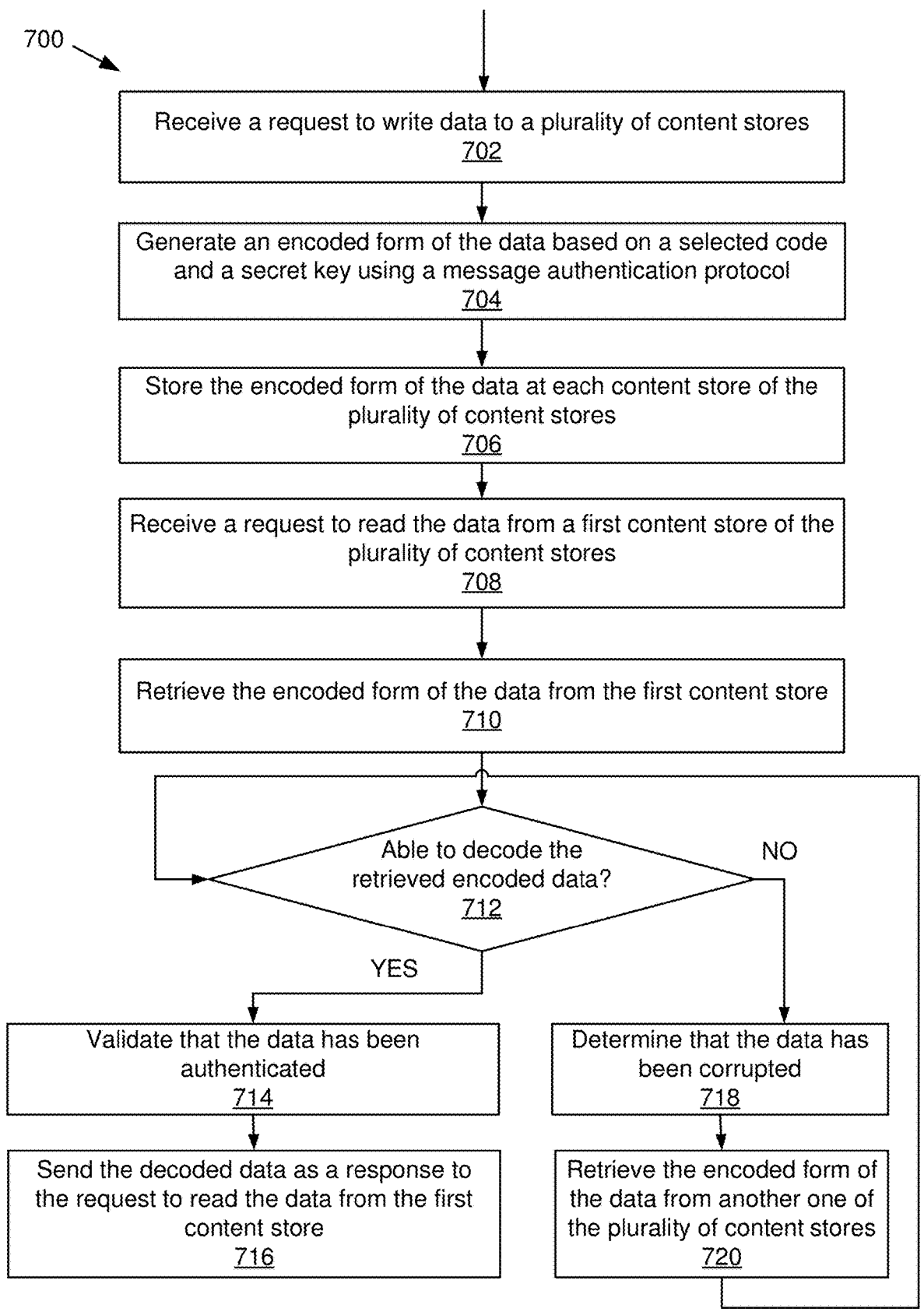
FIG. 7 is a flowchart of an example method for using the message authentication protocol for data storage using a plurality of content stores, according to the techniques described herein.

FIG. 7 is a flowchart of an example method 700 for using the message authentication protocol for data storage using a plurality of content stores, according to the techniques described herein. At 702, a storage manager 212 receives a request to write data to a plurality of content stores. In one embodiment, the request may be automatically generated as a result of a data protection and/or data redundancy scheme. The storage manager 212 may retrieve the data from memory in response to the request to write the data, in an embodiment. In another embodiment, the storage manager 212 may receive a request to write data to a plurality of content stores from a storage controller 106 based on a request from an application 108 or a client 102. At 704, the storage manager 212 uses the encoding module 214 to generate an encoded form of the data based on a selected code and a secret key using a message authentication protocol, similar to step 604 in FIG. 6 above.

At 706, the storage manager 212 stores the encoded form of the data at each content store of the plurality of content stores. At 708, the storage manager 212 receives a request to read the data from a first content store of the plurality of content stores. At 710, the storage manager 212 retrieves the encoded form of the data from the first content store.

At decision step 712, the storage manager 212 determines whether the retrieved encoded data is able to be decoded. For example, the decoding module 216, based on the original decoding algorithm 436.2 associated with the selected ECC scheme, may indicate that the encoded data is either able to be decoded validly to generate a valid word or is not able to be decoded validly (generating an invalid word). If the encoded data is able to be validly decoded, then the storage manager 212 validates that the data has been authenticated at step 714. Next, the decoded data is sent 716 as a response to the request to read the data from the first content store. However, if, at step 712, the encoded data is not able to be decoded validly, then at step 718, the storage manager 212 determines that the data has been corrupted. The storage manager 212 then, at step 720, retrieves the encoded form of the data from another one of the plurality of content stores. The method 700 then continues to decision point 712.

Figure 8:
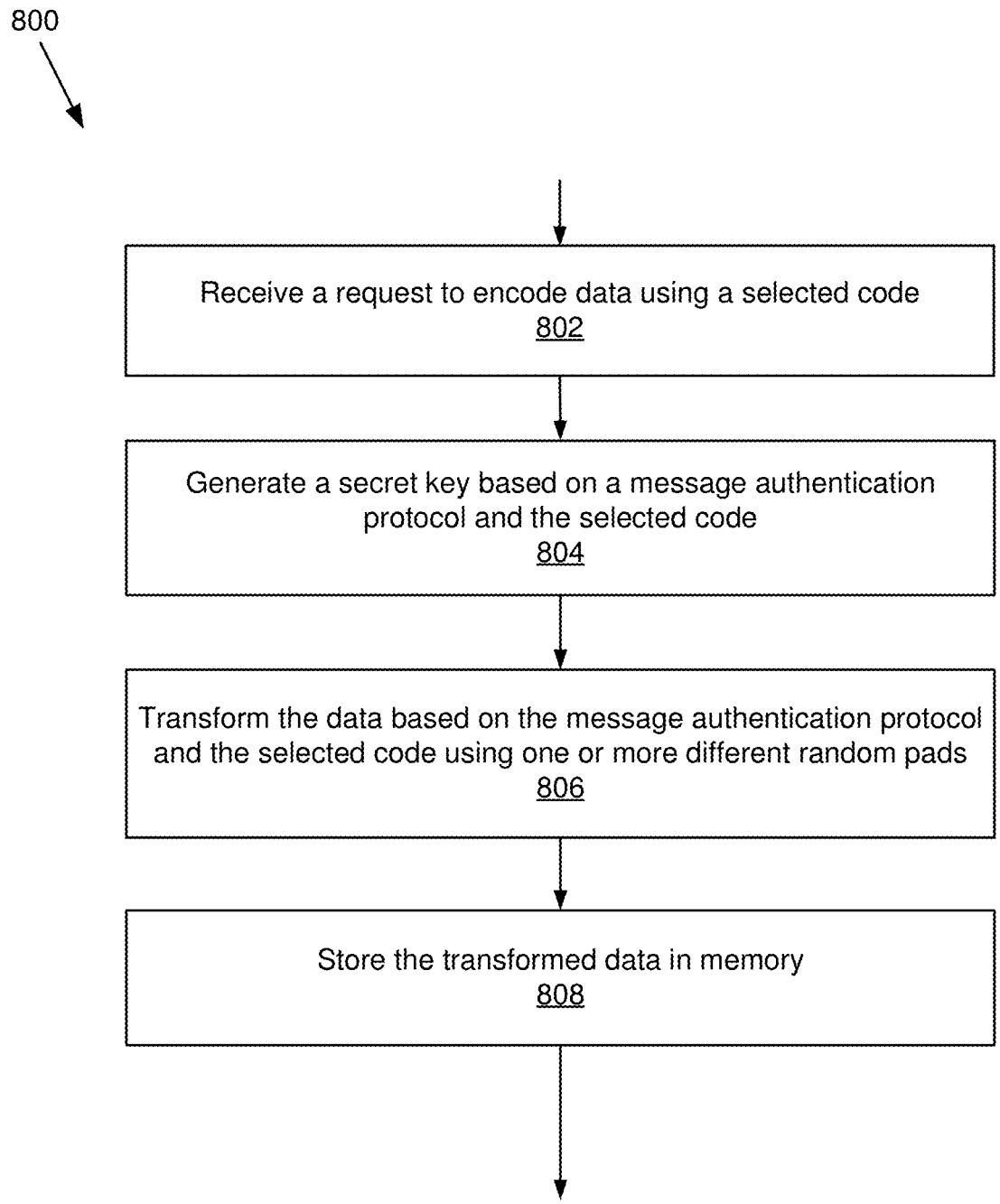
FIG. 8 is a flowchart of an example method for encoding data using the message authentication protocol, according to the techniques described herein.

FIG. 8 is a flowchart of an example method for encoding data using the message authentication protocol, according to the techniques described herein. Example method 800 includes, at step 802, receiving a request to encode data using a selected code. For example, a selected code may include an error code correction scheme such as binary BCH code, MDS/RS code, or LDPC code. Using techniques described herein with reference to FIGS. 1-7, the request may be received by a storage manager 212 and/or storage controller 106. The request may include code parameters for the constructed code, such as length of the message, length of the constructed code, and tolerance for bit flips/symbol flips. At step 804, a secret key is generated based on a message authentication protocol and the selected code, similar to steps 604 and 704 of FIGS. 6 and 7, respectively. At step 806, the data is transformed based on the message authentication protocol and the selected code using one or more different random pads. In an embodiment, the message authentication protocol may be extended to multiple messages using different random pads, as described above in reference to FIGS. 1-4. The data in the request may include multiple messages, in an embodiment. In another embodiment, a different secret key may be used for each message based on the request, where the first part of the secret key indicating a permutation of positions or transposition of symbols remains constant while the second part of the secret key uses different random pads. In yet another embodiment, the same secret key, including the first and second parts, may be used for the multiple messages based on the request. The transformation of the data is then completed based on the message authentication protocol and the selected code (e.g., ECC scheme). At step 808, the transformed data is stored in memory.

Systems and methods for storage-free message authentication for error-correction-codes have been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of data storage services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable ROMs (EPROMs), electrically erasable programmable ROMs (EEPROMs), magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

The invention claimed is:

1. A system comprising:
one or more processors; and
a memory storing instructions that, when executed, cause the one or more processors to:
   receive, at a storage controller of a storage device, a request to encode a message using an error-correcting code schema that generates a parity code;
   generate the parity code based on the error-correcting code schema;
   generate, at a key generating module on the storage device, a first parameter associated with the message, the first parameter comprising a pseudorandom transposition of characters of the message and the parity code;
   determine a pseudorandom character string based on the error-correcting code schema, the pseudorandom character string having a same number of characters as the first parameter;
   combine the first parameter and the pseudorandom character string to generate the encoded message;
   return the encoded message in response to the request; and
   store a secret key associated with the message in the memory, wherein the secret key comprises:
      the first parameter; and
      the pseudorandom character string as a second parameter.

2. The system of claim 1, wherein the instructions further cause the one or more processors to:
   receive, at the storage controller, a data retrieval request associated with a coded message stored in the memory;
   process the data retrieval request by decoding the encoded message using the error-correcting code schema and the secret key;
   responsive to the coded message being unsuccessfully decoded using the error-correcting code schema:
      retrieve the message as originally encoded and stored in the storage device; and
      decode the retrieved originally encoded message using the error-correcting code schema and the secret key; and
   return the decoded message responsive to the data retrieval request.

3. The system of claim 1, wherein:
the error-correcting code schema comprises a Bose-Chaudhuri-Hoquenghem (BCH) code;
the first parameter comprises a permutation of positions based on a pseudorandom function;
combining the first parameter and the pseudorandom character string comprises performing an exclusive-or (XOR) operation on the first parameter and the pseudorandom character string; and
the request to encode the message includes a plurality of parameters, the plurality of parameters including:
a z parameter indicating a number of zeroes to pad the message in encoding;
a k parameter indicating a number of characters in the message;
a n parameter indicating a number of characters in a constructed code comprising the message and the parity code; and
a t parameter indicating a maximum number of error corrections.

4. The system of claim 3, wherein the instructions further cause the one or more processors to:
receive, at the storage controller, a data retrieval request including a coded message stored in the memory;
process the data retrieval request by decoding the coded message using the secret key, the decoding comprising:
performing an XOR operation on the coded message and the second parameter;
performing an inverse transposing operation, using the first parameter, on a result of the XOR operation on the coded message and the second parameter; and
performing a BCH decoding operation on a result of the inverse transposing operation;
responsive to the BCH decoding operation returning an invalid word:
retrieve the message as originally encoded and stored in the storage device; and
decode the retrieved encoded message based on the BCH code using the secret key; and
return the decoded message responsive to the data retrieval request.

5. The system of claim 1, wherein the encoded message is stored in the storage device by the storage controller.

6. The system of claim 1, wherein:
the error-correcting code schema comprises a Maximum Distance Separable (MDS)/Reed-Solomon (RS) code;
combining the first parameter and the pseudorandom character string comprises performing a modulo operation on each character of the first parameter and each character of the pseudorandom character string based on ordinal position; and
the request to encode the message includes a plurality of parameters, the plurality of parameters including:
a q parameter indicating an alphabet size of the MDS/RS code;
a k parameter indicating a number of characters in the message;
a n parameter indicating a number of characters in a constructed code comprising the message and the parity code; and
a t parameter indicating a maximum number of error corrections.

7. The system of claim 6, wherein the instructions further cause the one or more processors to:
receive, at the storage controller, a data retrieval request including a coded message stored in the memory;
process the data retrieval request by decoding the coded message using the secret key, the decoding comprising:
performing a linear combination of each character of the coded message and each character of the second parameter based on ordinal position;
performing, for each ordinal position, a modulo operation of the linear combination and the q parameter;
performing an inverse transposing operation on a character string comprising each result of the modulo operation for each ordinal position, the inverse transposing operation on the character string based on the first parameter; and
performing an MDS/RS decoding operation on a result of the inverse transposing operation;
responsive to the MDS/RS decoding operation returning an invalid word:
retrieve the message as originally encoded and stored in the storage device; and
decode the retrieved encoded message using the secret key; and
return the decoded message responsive to the data retrieval request.

8. The system of claim 1, wherein:
the encoded message is stored in the storage device and a plurality of other storage devices by the storage controller; and
the instructions further cause the one or more processors to:
receive, at the storage controller, a data retrieval request associated with a coded message stored in the memory;
process the data retrieval request by decoding the encoded message using the error-correcting code schema and the secret key;
responsive to the coded message being unsuccessfully decoded using the error-correcting code schema:
retrieve the message as originally encoded from one of the storage device and another storage device of the plurality of other storage devices; and
decode the retrieved originally encoded message using the error-correcting code schema and the secret key; and
return the decoded message responsive to the data retrieval request.

9. The system of claim 1, wherein the pseudorandom character string is derived from a stored index using a pseudorandom function.

10. The system of claim 1, wherein:
the message comprises a plurality of unique messages; and
the instructions further cause the one or more processors to:
determine a unique pseudorandom character string based on the error-correcting code schema associated with each unique message of the plurality of unique messages, each unique pseudorandom character string having a same number of characters as the first parameter;
combine the first parameter and each unique pseudorandom character string to generate a plurality of encoded messages;
return the plurality of encoded message in response to the request; and
store a plurality of unique secret keys associated with the plurality of encoded messages in a memory of the storage device accessible by the storage controller, wherein each unique secret key comprises:

the first parameter; and
the each unique pseudorandom character string as a second parameter.

11. A computer-implemented method comprising:
receiving, at a storage controller of a storage device, a request to encode a message using an error-correcting code schema that generates a parity code;
generating the parity code based on the error-correcting code schema;
generating, at a key generating module on the storage device, a first parameter associated with the message, wherein the first parameter comprises a pseudorandom transposition of characters of the message and the parity code;
determining a pseudorandom character string based on the error-correcting code schema, the pseudorandom character string having a same number of characters as the first parameter;
combining the first parameter and the pseudorandom character string to generate the encoded message;
returning the encoded message in response to the request; and
storing a secret key associated with the message in a memory of the storage device accessible by the storage controller, wherein the secret key comprises:
the first parameter; and
the pseudorandom character string as a second parameter.

12. The computer implemented method of claim 11, further comprising:
receiving, at the storage controller, a data retrieval request associated with a coded message stored in the memory;
processing the data retrieval request by decoding the coded message using the error-correcting code schema and the secret key;
responsive to the coded message being unsuccessfully decoded using the error-correcting code schema:
retrieving the message as originally encoded and stored in the storage device; and
decoding the retrieved originally encoded message using the error-correcting code schema and the secret key; and
returning the decoded message responsive to the data retrieval request.

13. The computer-implemented method of claim 11, wherein:
the error-correcting code schema comprises a Bose-Chaudhuri-Hoquenghem (BCH) code;
the first parameter comprises a permutation of positions based on a pseudorandom function;
combining the first parameter and the pseudorandom character string comprises performing an exclusive-or (XOR) operation on the first parameter and the pseudorandom character string; and
the request to encode the message includes a plurality of parameters, the plurality of parameters including:
a z parameter indicating a number of zeroes to pad the message in encoding;
a k parameter indicating a number of characters in the message;
a n parameter indicating a number of characters in a constructed code comprising the message and the parity code; and
a t parameter indicating a maximum number of error corrections.

14. The computer-implemented method of claim 13, further comprising:
receiving, at the storage controller, a data retrieval request associated with a coded message stored in the memory;
processing the data retrieval request by decoding the coded message using the secret key, the decoding comprising:
performing an XOR operation on the coded message and the second parameter;
performing an inverse transposing operation, using the first parameter, on a result of the XOR operation on the coded message and the second parameter; and
performing a BCH decoding operation on a result of the inverse transposing operation;
responsive to the BCH decoding operation returning an invalid word:
retrieving the message as originally encoded and stored in the storage device; and
decoding the retrieved encoded message based on the BCH code using the secret key; and
returning the decoded message responsive to the data retrieval request.

15. The computer-implemented method of claim 11, wherein the encoded message is stored in the storage device by the storage controller.

16. The computer-implemented method of claim 11, wherein:
the error-correcting code schema comprises a Maximum Distance Separable (MDS)/Reed-Solomon (RS) code;
combining the first parameter and the pseudorandom character string comprises performing a modulo operation on each character of the first parameter and each character of the pseudorandom character string based on ordinal position; and
the request to encode the message includes a plurality of parameters, the plurality of parameters including:
a q parameter indicating an alphabet size of the MDS/RS code;
a k parameter indicating a number of characters in the message;
a n parameter indicating a number of characters in a constructed code comprising the message and the parity code; and
a t parameter indicating a maximum number of error corrections.

17. The computer-implemented method of claim 16, further comprising:
receiving, at the storage controller, a data retrieval request associated with a coded message stored in the memory;
processing the data retrieval request by decoding the coded message using the secret key, the decoding comprising:
performing a linear combination of each character of the coded message and each character of the second parameter based on ordinal position;
performing, for each ordinal position, a modulo operation of the linear combination and the q parameter;
performing an inverse transposing operation on a character string comprising each result of the modulo operation for each ordinal position, the inverse transposing operation on the character string based on the first parameter; and
performing an MDS/RS decoding operation on a result of the inverse transposing operation;
responsive to the MDS/RS decoding operation returning an invalid word:
retrieving the message as originally encoded and stored in the storage device; and decoding the retrieved originally encoded message using the secret key; and returning the decoded message responsive to the data retrieval request.

18. The computer implemented method of claim 11, wherein:

the encoded message is stored in the storage device and a plurality of other storage devices by the storage controller; and the method further comprises:

receiving, at the storage controller, a data retrieval request associated with a coded message stored in the memory;

processing the data retrieval request by decoding the encoded message using the error-correcting code schema and the secret key;

responsive to the coded message being unsuccessfully decoded using the error-correcting code schema:

retrieving the message as originally encoded from one of the storage device and another storage device of the plurality of other storage devices; and decoding the retrieved originally encoded message using the error-correcting code schema and the secret key; and returning the decoded message responsive to the data retrieval request.

19. The computer implemented method of claim 11, wherein:

the message comprises a plurality of unique messages; and the method further comprises:

determining a unique pseudorandom character string based on the error-correcting code schema associated with each unique message of the plurality of unique messages, each unique pseudorandom character string having a same number of characters as the first parameter;

combining the first parameter and each unique pseudorandom character string to generate a plurality of encoded messages;

returning the plurality of encoded message in response to the request; and storing a plurality of unique secret keys associated with the plurality of encoded messages in a memory of the storage device accessible by the storage controller, wherein each unique secret key comprises:

the first parameter; and the each unique pseudorandom character string as a second parameter.

20. A system, comprising:

means for receiving, at a storage controller of a storage device, a request to encode a message using an error-correcting code schema that generates a parity code;

means for generating the parity code based on the error-correcting code schema;

means for generating, at a key generating module on the storage device, a first parameter associated with the message, wherein the first parameter comprises a pseudorandom transposition of characters of the message and the parity code;

means for determining a pseudorandom character string based on the error-correcting code schema, the pseudorandom character string having a same number of characters as the first parameter;

means for combining the first parameter and the pseudorandom character string to generate the encoded message;

means for returning the encoded message in response to the request; and means for storing a secret key associated with the message in a memory of the storage device accessible by the storage controller, wherein the secret key comprises:

the first parameter; and the pseudorandom character string as a second parameter.

\* \* \* \* \*